US011207836B2

(12) United States Patent
Ramos et al.

(10) Patent No.: US 11,207,836 B2
(45) Date of Patent: Dec. 28, 2021

(54) SYSTEMS AND METHODS OF MACHINE VISION ASSISTED ADDITIVE FABRICATION

(71) Applicant: Massachusetts Institute of Technology, Cambridge, MA (US)

(72) Inventors: Javier E. Ramos, Brookline, MA (US); Pitchaya Sitthi-Amorn, Cambridge, MA (US); Wojciech Matusik, Lexington, MA (US); Yuwang Wang, Beijing (CN)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/526,068

(22) Filed: Jul. 30, 2019

(65) Prior Publication Data
US 2020/0147888 A1 May 14, 2020

Related U.S. Application Data

(63) Continuation of application No. 15/582,320, filed on Apr. 28, 2017, now abandoned, which is a
(Continued)

(51) Int. Cl.
*B29C 64/386* (2017.01)
*B33Y 10/00* (2015.01)
(Continued)

(52) U.S. Cl.
CPC .......... *B29C 64/386* (2017.08); *B29C 64/106* (2017.08); *B29C 64/393* (2017.08);
(Continued)

(58) Field of Classification Search
CPC .............................. B29C 64/386; B33Y 50/02
(Continued)

(56) References Cited

U.S. PATENT DOCUMENTS

| 5,879,489 A | 3/1999 | Burns |
| 6,147,846 A | 11/2000 | Borg |

(Continued)

FOREIGN PATENT DOCUMENTS

| CN | 102422327 A | 4/2012 |
| CN | 103201772 A | 7/2013 |

(Continued)

OTHER PUBLICATIONS

Introduction to Digital Images, Internet Archive Wayback Machine, https://web.archive.org/web/20130628011645/www.introcomputing.org/image-1-introduction.html, published Jun. 28, 2013.
(Continued)

*Primary Examiner* — Jacob T Minskey
*Assistant Examiner* — Russell E Sparks
(74) *Attorney, Agent, or Firm* — Occhiuti & Rohlicek LLP

(57) ABSTRACT

The present application relates generally to systems and methods for using machine vision to provide information on one or more aspects of an additive fabrication device, such as calibration parameters and/or an object formed by the device or in the process of being formed by the device. According to some aspects, a method is provided for calibrating an additive fabrication device. According to some aspects, a method is provided for assessing at least a portion of an object formed using an additive fabrication device. According to some aspects, a method is provided for fabricating a second object in contact with a first object using an additive fabrication device. According to some aspects, an additive fabrication device configured to perform one or more of the above methods may be provided.

15 Claims, 14 Drawing Sheets

Related U.S. Application Data continuation of application No. 14/645,616, filed on Mar. 12, 2015, now Pat. No. 10,252,466.

(60) Provisional application No. 62/029,921, filed on Jul. 28, 2014.

(51) Int. Cl.
*B29C 64/393* (2017.01)
*B33Y 30/00* (2015.01)
*B33Y 50/02* (2015.01)
*B29C 64/106* (2017.01)
*B29C 64/112* (2017.01)

(52) U.S. Cl.
CPC .............. *B33Y 10/00* (2014.12); *B33Y 30/00* (2014.12); *B33Y 50/02* (2014.12); *B29C 64/112* (2017.08)

(58) Field of Classification Search
USPC ....................................................... 264/40.1
See application file for complete search history.

(56) References Cited

U.S. PATENT DOCUMENTS

| | | | |
|---|---|---|---|
| 6,347,257 B1 | 2/2002 | Bedal | |
| 6,492,651 B2 | 12/2002 | Kerekes | |
| 6,508,971 B2 | 1/2003 | Leyden et al. | |
| 6,521,489 B2 | 2/2003 | Duthaler et al. | |
| 6,658,314 B1 | 12/2003 | Gothait | |
| 6,907,307 B2 | 6/2005 | Chen et al. | |
| 7,077,334 B2 | 7/2006 | Sachs et al. | |
| 7,225,045 B2 | 5/2007 | Gothait et al. | |
| 7,300,619 B2 | 11/2007 | Napadensky | |
| 7,387,359 B2 * | 6/2008 | Hernandez ........... | B41J 2/16532 347/29 |
| 7,500,846 B2 | 3/2009 | Eshed et al. | |
| 7,596,249 B2 | 9/2009 | Bacus et al. | |
| 7,706,909 B2 | 4/2010 | Silverbrook | |
| 7,747,341 B2 | 6/2010 | Dubois et al. | |
| 8,029,096 B2 | 10/2011 | Silverbrook | |
| 8,087,755 B2 | 1/2012 | Silverbrook | |
| 8,147,910 B2 | 4/2012 | Kritchman | |
| 8,263,129 B2 | 9/2012 | Desimone et al. | |
| 8,313,163 B2 | 11/2012 | Eun et al. | |
| 8,323,017 B2 | 12/2012 | Kritchman et al. | |
| 8,451,510 B2 | 5/2013 | Hwang et al. | |
| 8,521,320 B2 | 8/2013 | Silverbrook | |
| 8,579,620 B2 | 11/2013 | Wu | |
| 8,666,142 B2 | 3/2014 | Shkolnik et al. | |
| 8,761,918 B2 | 6/2014 | Silverbrook | |
| 8,876,513 B2 | 11/2014 | Lim et al. | |
| 8,932,511 B2 | 1/2015 | Napadensky | |
| 9,079,337 B2 | 7/2015 | Lipton | |
| 9,132,587 B2 | 9/2015 | Eshed et al. | |
| 9,202,310 B2 | 12/2015 | Bickel et al. | |
| 9,205,690 B2 | 12/2015 | Leavitt et al. | |
| 9,327,537 B2 | 5/2016 | Conrow et al. | |
| 9,632,983 B2 * | 4/2017 | Ueda ................... | B29C 64/124 |
| 9,731,452 B2 * | 8/2017 | Din ................... | G05B 19/4086 |
| 9,770,869 B2 | 9/2017 | Comb | |
| 9,776,364 B2 * | 10/2017 | Wang ................... | B29C 64/393 |
| 9,886,526 B2 * | 2/2018 | Huang ................... | B22F 10/00 |
| 10,232,553 B2 | 3/2019 | Joyce | |
| 10,252,466 B2 | 4/2019 | Ramos et al. | |
| 2002/0093115 A1 | 7/2002 | Jang | |
| 2002/0104973 A1 | 8/2002 | Kerekes | |
| 2002/0149137 A1 | 10/2002 | Jang et al. | |
| 2002/0164181 A1 | 11/2002 | Parker et al. | |
| 2003/0008660 A1 | 1/2003 | Forrester | |
| 2003/0086603 A1 | 5/2003 | Davidson | |
| 2004/0004614 A1 | 1/2004 | Bacus | |
| 2004/0021718 A1 | 2/2004 | Bell et al. | |
| 2004/0051756 A1 | 3/2004 | Takenaka | |
| 2004/0186608 A1 | 9/2004 | Hiatt et al. | |
| 2004/0217186 A1 | 11/2004 | Sachs | |
| 2006/0054039 A1 | 3/2006 | Kritchman et al. | |
| 2006/0111807 A1 | 5/2006 | Gothait et al. | |
| 2006/0156978 A1 | 7/2006 | Lipson | |
| 2008/0055581 A1 | 3/2008 | Rogers et al. | |
| 2008/0252682 A1 | 10/2008 | Hernandez et al. | |
| 2009/0032312 A1 | 2/2009 | Huang et al. | |
| 2009/0323129 A1 | 12/2009 | Hwang | |
| 2010/0125356 A1 | 5/2010 | Shkolnik et al. | |
| 2011/0075171 A1 | 3/2011 | Hoshii | |
| 2011/0285054 A1 | 11/2011 | Eliahu | |
| 2012/0180084 A1 * | 7/2012 | Huang ................. | H04N 5/2723 725/32 |
| 2012/0282448 A1 | 11/2012 | Chretien et al. | |
| 2012/0295077 A1 | 11/2012 | Ficek et al. | |
| 2013/0016100 A1 | 1/2013 | Bickel | |
| 2013/0089642 A1 | 4/2013 | Lipson | |
| 2013/0095302 A1 | 4/2013 | Pettis et al. | |
| 2013/0162643 A1 | 6/2013 | Cardle | |
| 2013/0241114 A1 | 9/2013 | Ravich et al. | |
| 2013/0242317 A1 | 9/2013 | Leavitt et al. | |
| 2014/0039663 A1 | 2/2014 | Boyer et al. | |
| 2014/0309764 A1 | 10/2014 | Socha-Leialoha | |
| 2015/0026119 A1 | 1/2015 | Fischer et al. | |
| 2015/0026624 A1 | 1/2015 | Hui et al. | |
| 2015/0134096 A1 | 5/2015 | Travers et al. | |
| 2015/0251358 A1 | 9/2015 | Ho et al. | |
| 2015/0261196 A1 | 9/2015 | Wilson | |
| 2015/0266242 A1 | 9/2015 | Comb | |
| 2015/0352872 A1 | 12/2015 | Row | |
| 2016/0023403 A1 | 1/2016 | Ramos et al. | |
| 2016/0263822 A1 | 9/2016 | Boyd, IV | |
| 2016/0342149 A1 | 11/2016 | Napadensky | |
| 2017/0050374 A1 | 2/2017 | Minardi | |
| 2017/0120337 A1 | 5/2017 | Kanko et al. | |
| 2017/0275414 A1 | 9/2017 | Kwisnek et al. | |
| 2017/0318186 A1 | 11/2017 | Morovic | |
| 2017/0341183 A1 | 11/2017 | Buller | |

FOREIGN PATENT DOCUMENTS

| | | |
|---|---|---|
| EP | 1498277 A1 | 1/2005 |
| GB | 2483285 A | 3/2012 |
| JP | H05190423 A | 7/1993 |
| JP | 2007151631 A | 6/2007 |
| JP | 2012101445 A | 5/2012 |
| JP | 5190423 B2 | 4/2013 |
| WO | 2007013240 A1 | 2/2007 |
| WO | 2008044693 A1 | 4/2008 |
| WO | 20140015994 A1 | 1/2014 |
| WO | 2015153764 A1 | 10/2015 |
| WO | 2016019434 A1 | 2/2016 |
| WO | 2016193934 A1 | 12/2016 |

OTHER PUBLICATIONS

Nemeth, A., Hannesschlaeger, G., Leiss-Holzinger, E., Wiesauer, K., Leitner, M., "Optical Coherence Tomography—Applicantion in Non-Destructive Testing and Evaluation", Optical Coherence Tomography, Chapter 9, pp. 163-185, published 2013.

Alexa, Marc, and Wojciech Matusik. "Reliefs as images." ACM Trans. Graph. 29, No. 4 (2010): 60-1.

Sitthi-Amorn, Pitchaya, Javier E. Ramos, Yuwang Wangy, Joyce Kwan, Justin Lan, Wenshou Wang, and Wojciech Matusik. "MultiFab: a machine vision assisted platform for multi-material 3D printing." ACM Transactions on Graphics (TOG) 34, No. 4 (2015): 129.

S. Sundaram, Z. Jiang, P. Sitthi-Amorn, D. S. Kim, M. A. Baldo, W. Matusik, 3D-Printed Autonomous Sensory Composites. Adv. Mater. TechnoL Jan. 4, 2017, 2, 1600257, 6 pages.

* cited by examiner

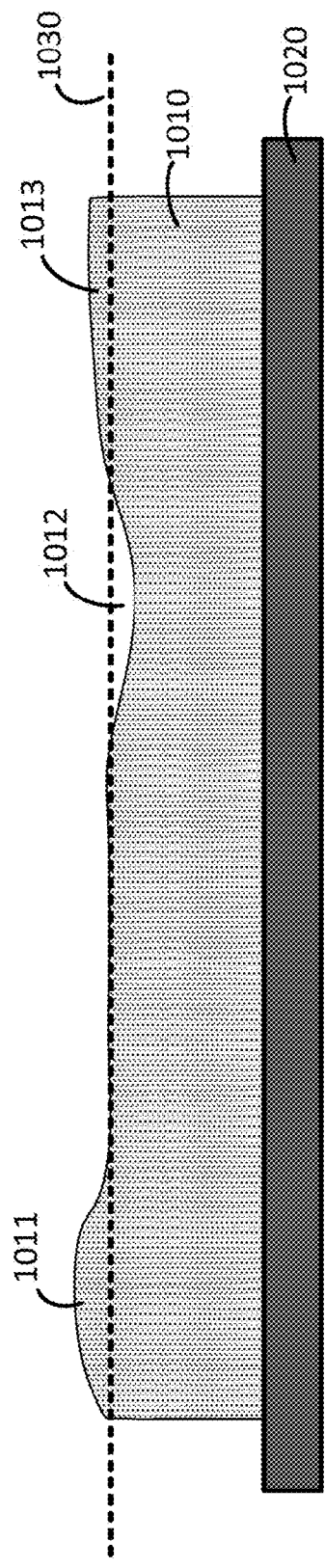
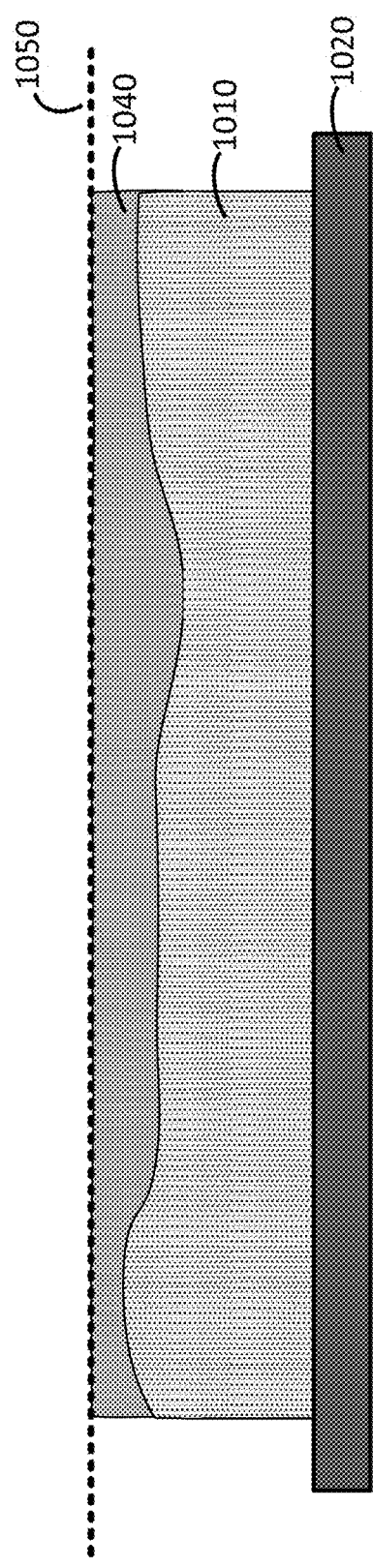

SYSTEMS AND METHODS OF MACHINE VISION ASSISTED ADDITIVE FABRICATION

CROSS-REFERENCE TO RELATED APPLICATIONS

This application is a continuation application claiming the benefit under 35 U.S.C. § 120 of U.S. patent application Ser. No. 15/582,320, filed Apr. 28, 2017, now abandoned, which is a continuation of U.S. Pat. No. 10,252,466 entitled "Systems and Methods of Machine Vision Assisted Additive Fabrication," which claims the benefit under 35 U.S.C. § 119(e) of U.S. Provisional Patent Application Ser. No. 62/029,921, filed Jul. 28, 2014, titled "Machine Vision Assisted 3D Printing Platform." The referenced applications are hereby incorporated by reference in their entireties.

STATEMENT REGARDING FEDERALLY SPONSORED RESEARCH OR DEVELOPMENT

This invention was made with government support under Grant No. U.S. Pat. No. 1,116,296 awarded by the National Science Foundation and under Contract No. N66001-12-1-4242 awarded by the Space and Naval Warfare Systems Center. The government has certain rights in the invention.

BACKGROUND

Additive fabrication, e.g., 3-dimensional (3D) printing, provides techniques for fabricating objects, typically by causing portions of a building material to solidify and/or combine at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering, polyjet, or combinations thereof. Many additive fabrication techniques build parts by forming successive layers, which are typically cross-sections of the desired object. Typically each layer is formed such that it adheres to either a previously formed layer or a substrate upon which the object is built.

SUMMARY

According to some embodiments, a method is provided of calibrating an additive fabrication device comprising a build platform, an imaging device and one or more printheads, the method comprising determining a first spatial mapping at least in part by imaging a calibration pattern located on the build platform using the imaging device, fabricating a calibration object on the build platform using a first printhead of the one or more printheads, determining a second spatial mapping at least in part by imaging the fabricated calibration object using the imaging device, determining a spatial mapping from the first printhead to the build platform based at least in part on the first and second spatial mappings, and adjusting one or more settings associated with the first printhead based at least in part on the determined spatial mapping from the first printhead to the build platform.

According to some embodiments, an additive fabrication apparatus is provided comprising a build platform, at least a first printhead, the first printhead having one or more settings, an imaging device, and at least one processor configured to determine a first spatial mapping at least in part by imaging a calibration pattern located on the build platform using the imaging device, determine a second spatial mapping at least in part by imaging, using the imaging device, a calibration object formed using the first printhead, determine a spatial mapping from the first printhead to the build platform based at least in part on the first and second spatial mappings, and adjust at least one of the one or more settings of the first printhead based at least in part on the determined spatial mapping from the first printhead to the build platform.

According to some embodiments, a method is provided of leveling a build platform of an additive fabrication device using an imaging device situated above the build platform, the method comprising imaging, using the imaging device, at least a portion of a calibration pattern located on the build platform, determining a plurality of focus measurements of the imaged at least a portion of the calibration pattern, identifying an orientation of the build platform based at least in part on the plurality of focus measurements, and adjusting the orientation of the build platform based on the determined orientation.

According to some embodiments, a method is provided of assessing at least a portion of an object formed using an additive fabrication device, the additive fabrication device comprising a build platform and an imaging device, the method comprising forming the at least a portion of the object on the build platform via additive fabrication, scanning a surface region of the at least a portion of the object with the imaging device, wherein the scanning comprises capturing a first image of the surface region of the at least a portion of the object with the imaging device, the first image captured when the surface region of the at least a portion of the object is a first distance from the imaging device, and capturing a second image of the surface region of the at least a portion of the object with the imaging device, the second image captured when the surface region of the at least a portion of the object is a second distance from the imaging device, different from the first distance, and determining a depth map of the surface region of the at least a portion of the object based at least in part on the first and second images.

According to some embodiments, an additive fabrication apparatus is provided comprising a build platform, at least one printhead, an imaging device, and at least one controller configured to operate the at least one printhead to form at least a portion of an object on the build platform, operate the imaging device to capture a first image of a surface region of the at least a portion of the object, the first image captured when the surface region of the at least a portion of the object is a first distance from the imaging device, and capture a second image of the surface region of the at least a portion of the object, the second image captured when the surface region of the at least a portion of the object is a second distance from the imaging device, different from the first distance, and determine a depth map of the surface region of the at least a portion of the object based at least in part on the first and second images.

According to some embodiments, a method is provided of assessing at least a portion of an object formed using an additive fabrication device, the additive fabrication device comprising a build platform and an imaging device, the method comprising forming the at least a portion of the object on the build platform via additive fabrication, scanning a surface region of the at least a portion of the object with the imaging device, wherein the scanning comprises capturing a first image of the surface region of the at least a portion of the object with the imaging device at a first wavelength of light, and capturing a second image of the surface region of the at least a portion of the object with the imaging device at a second wavelength of light, different from the first wavelength of light, and determining a depth map of the surface region of the at least a portion of the object based at least in part on the first and second images.

According to some embodiments, an additive fabrication apparatus is provided comprising a build platform, at least one printhead, an imaging device, and at least one controller configured to operate the at least one printhead to form at least a portion of an object on the build platform, operate the imaging device to capture a first image of a surface region of the at least a portion of the object at a first wavelength of light, and capture a second image of the surface region of the at least a portion of the object at a second wavelength of light, different from the first wavelength of light, and determine a depth map of the surface region of the at least a portion of the object based at least in part on the first and second images.

According to some embodiments, a method is provided of fabricating a second object in contact with a first object using an additive fabrication device comprising a build platform, the method comprising obtaining a three-dimensional model representing the second object, sensing at least one three-dimensional surface region of the first object when the first object is located on the build platform, transforming at least a portion of the three-dimensional model based at least in part on a result of said sensing, and fabricating, via additive fabrication, the second object in contact with the first object based at least in part on the transformed three-dimensional model.

According to some embodiments, an additive fabrication apparatus is provided comprising a build platform, at least one printhead, an imaging device, and at least one controller configured to sense, via the imaging device, at least one three-dimensional surface region of a first object when the first object is located on the build platform, and operate the at least one printhead to form a second object in contact with the first object, wherein the second object has been configured to match, at least in part, the at least one three-dimensional surface region of the first object.

The foregoing summary is provided by way of illustration and is not intended to be limiting.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 10A-B depict an example of performing additive fabrication in response to sensing of a surface of an object being fabricated, according to some embodiments;

DETAILED DESCRIPTION

Figure 1:
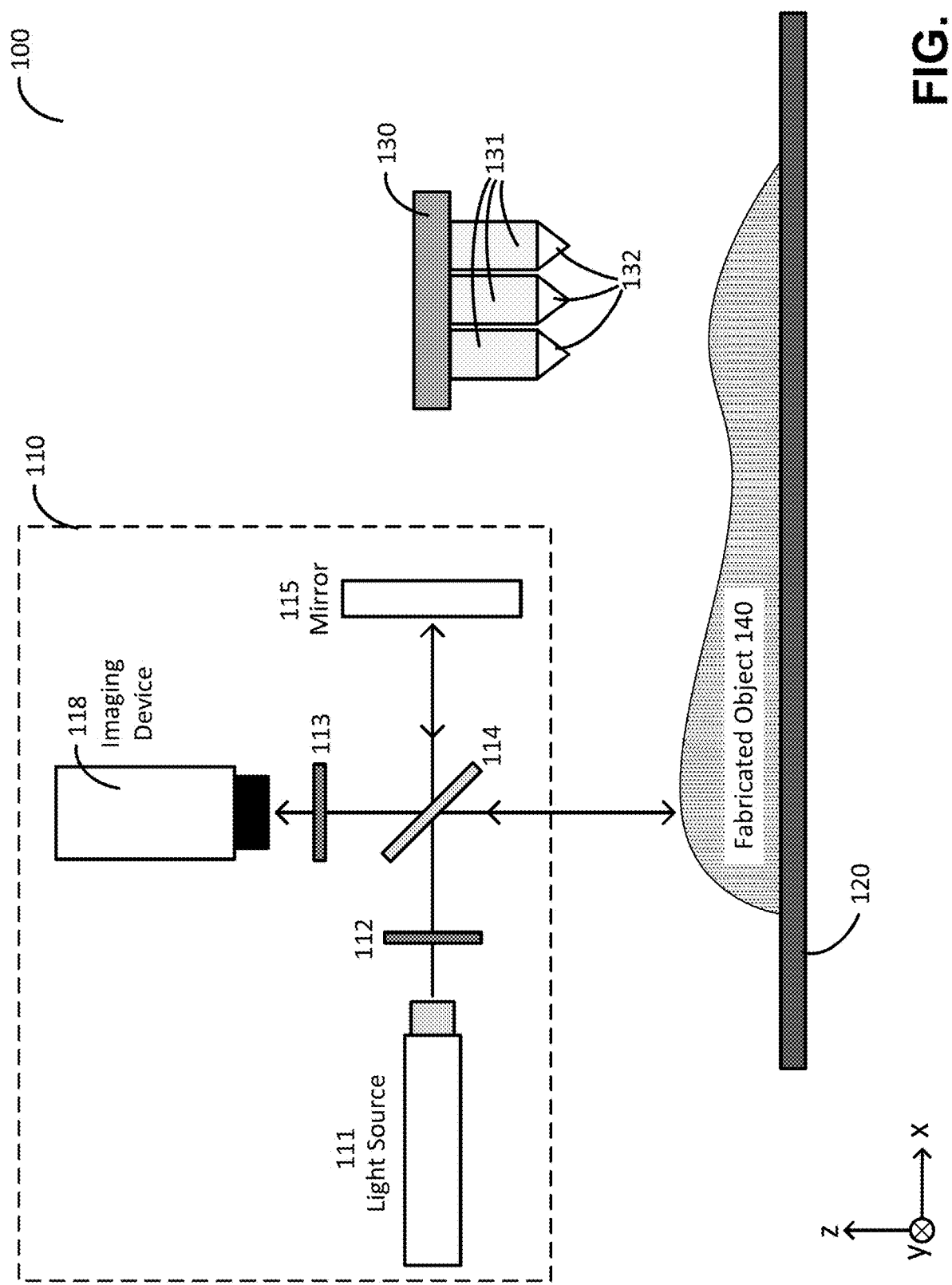
FIG. 1 depicts an illustrative system suitable for practicing machine vision within an additive fabrication device, according to some embodiments.

The present application relates generally to systems and methods for using machine vision to provide information on one or more aspects of an additive fabrication device, such as calibration parameters and/or an object formed by the device or in the process of being formed by the device.

An additive fabrication device generally must be calibrated to ensure that objects fabricated by the device are accurate representations of an intended form of the object. For example, additive fabrication devices typically fabricate an object on a build platform, such that a first layer of the object is formed on the build platform and subsequent layers are formed on previously formed layers. If the build platform is not oriented correctly, formed layers of the object may not have a consistent thickness, and/or may not properly adhere to the build platform and/or previously formed layers, leading to a formed object that does not accurately represent the intended object.

In addition, some types of additive fabrication devices utilize material feeders (often referred to as "printheads") that have components with one or more adjustable degrees of freedom, such as one or more positions and/or orientations. By adjusting these degrees of freedom, the way in which material is formed by each printhead may be adjusted. In additive fabrication devices that utilize multiple printheads, the printheads may need to be adjusted relative to one another to ensure that material produced by each printhead is deposited in the intended location. For example, an additive fabrication device may include a plurality of printheads, each having a nozzle that directs material to a build platform and/or an object being fabricated. In order to produce material from one printhead precisely on top of material produced from another printhead, the nozzles must be appropriately aligned relative to one another. However, this calibration process can be both time consuming and expensive to perform, often requiring an experienced technician to perform the process.

Even once an additive fabrication device has been calibrated, further issues can develop during fabrication of an object. Minor variations in temperature and/or the introduction of foreign particles (e.g., dust) to the fabrication process can cause imperfections in a fabricated object (e.g., discrepancies between a fabricated object and the intended form of the object). However, these imperfections are conventionally difficult or impossible to detect during fabrication, and even if they could be detected, an additive fabrication device cannot generally be instructed to perform subsequent actions that compensate, at least in part, for these imperfections. Thus, whether a fabricated object successfully represents the intended object tends to be based on how thoroughly calibrated the device is before beginning fabrication, and/or how clean the fabrication environment is.

Finally, additive fabrication devices are generally limited to fabricating objects on a flat build platform. Since additive fabrication devices form material at small scales (e.g., between 0.01 μm and 500 μm), any surface on which material is to be formed must be understood at roughly the scale of the material formation. Otherwise, a fabricated object would be subject to the variations in height of the build platform and would be produced in uneven layers. Consequently, fabricated objects must include at least one completely flat surface where an initial layer of the object is formed on the flat build platform. This limits the universe of objects that can be successfully additively fabricated. A given object placed on the build platform may not be used as a base for fabrication of an object unless the object's surface structure is understood at roughly the scale of the material formation on the object.

The inventors have recognized and appreciated that the above problems may be mitigated by using machine vision within an additive fabrication device to provide feedback to the additive fabrication device during one or more stages of fabrication (including pre- and/or post-fabrication). Such a machine vision system may provide feedback during calibration of the device, may provide feedback prior to and/or during fabrication of an object, and/or may provide feedback on a fabricated object. The machine vision system may be capable of sensing a 3-dimensional surface, such as that of a build platform, an object being fabricated, a fabricated object and/or a non-fabricated object.

In some embodiments, one or more aspects of an additive fabrication system and/or process may be adjusted based on one or more results of sensing a surface (e.g., a build platform, a surface of an object being fabricated, a surface of a fabricated object, a surface of a non-fabricated object, etc.). For example, during calibration of an additive fabrication device, a machine vision system may sense an orientation of a build platform, which may allow the build platform to be appropriately reoriented. The system may additionally or alternatively sense a surface of a fabricated calibration object, which may indicate how to adjust one or more printheads to more accurately fabricate subsequent objects.

During fabrication by the additive fabrication device, a machine vision system may provide feedback on imperfections in the fabrication process by sensing a surface of the object being fabricated. This feedback may be used, for example, to adjust the fabrication process to compensate for the observed imperfections. In addition, or alternatively, feedback on one or more surfaces of a fabricated object may provide information on a tolerance of the object. Prior to fabrication by the additive fabrication device, one or more surfaces of an auxiliary object (i.e., an object other than an object being fabricated, which may or may not have been produced via additive fabrication) may be sensed. This may, for example, allow an object to be fabricated by the additive fabrication device in contact with the auxiliary object.

In some embodiments, a machine vision system may include a device with a high optical resolution, such as a resolution below 50 μm. The device may sense a surface in any suitable way, including by sensing a distance from the device to the surface, and/or by sensing a shape of the surface. For example, the device may include a high resolution depth scanner, such as a terahertz imager or an Optical Coherence Tomography (OCT) system, and/or may include one or more imaging devices suitable for use with shape from specular reflection and/or depth from focus techniques. In some embodiments, the machine vision system may be configured to sense a surface within a few seconds.

In some embodiments, a build platform may be sensed by the machine vision system prior to fabrication of an object. The position and/or orientation of the build platform may indicate how to move and/or reorient the build platform prior to commencement of fabrication to appropriately calibrate the build platform. For example, sensing a vertical distance from the machine vision system to the build platform (e.g., a distance along an axis parallel to an optical axis of the machine vision system) may indicate a slope of the build platform relative to axes of the additive fabrication device. The build platform may thereby be leveled by adjusting the orientation of the build platform based on the observed slope. In some use cases, the build platform's orientation may be adjusted by one or more actuators (e.g., stepper motors), which may for example be controlled by a computer or other device that determines how to adjust the orientation of the build platform. In some embodiments, sensing a build platform may be used to identify a relative position of a machine vision system to the build platform.

In some embodiments, one or more aspects of an additive fabrication device's configuration may be adjusted based on sensing a fabricated object. By fabricating a calibration object having recognizable features (e.g., a grid) and sensing the object, the additive fabrication device's ability to accurately fabricate the object may be evaluated. One or more aspects of the device's configuration may thereby be adjusted based on that evaluation. For example, sensing the calibration object may indicate a relative positioning of a printhead used to form the calibration object to a machine vision system used to sense the object. In some embodiments, combining this information with relative positioning of the machine vision system to a build platform on which the calibration object is formed may indicate a deviation of the calibration object from an intended object. For example, the combined information may indicate that an aspect of the printhead (e.g., a nozzle direction) should be adjusted to produce the calibration object in an intended location and/or in an intended shape.

In some embodiments, material may be formed by an additive fabrication device based on sensing of an object during fabrication of the object. As discussed above, sensing of a surface of an object during its fabrication may indicate imperfections and/or errors in fabrication. By identifying said imperfections and/or errors, subsequent material may be produced (e.g., in subsequent layers of material during fabrication) that compensate, at least to some extent, for the imperfections and/or errors. For example, in a region in which more material has been deposited than intended based on the fabrication process, one or more subsequent layers of material may be produced having less material than would otherwise have been placed in that region. Similarly, in a region in which less material has been deposited than intended, one or more subsequent layers may produce additional material than would otherwise have been produced. In some embodiments, a binary mask may be used to limit the above analysis to a particular area (which may or may not be a contiguous area) of a surface of an object being fabricated.

In some embodiments, one or more surfaces of a partially-fabricated or fabricated object may be sensed and analyzed.

Sensing of a surface of a fabricated object may allow for calculation of a tolerance of the object, such as for use in engineering specifications. In some use cases, a volumetric discrepancy between a model of an object and the fabricated object may be determined by sensing the object during and/or after its fabrication. In some use cases, fabrication of an object may be terminated by sensing a surface of the object during its fabrication and terminating fabrication if a tolerance of the surface does not meet an objective criteria. Sensing of an object during its fabrication may provide information on regions of the object that are hard to examine and/or not visible once fabrication is completed. For example, an interior cavity of an object (i.e., a cavity that is completely enclosed by material) would be impossible to examine without performing tomography through the body of the object or breaking the object apart. However, by sensing the object during its fabrication, information on the interior cavity (e.g., size, shape) may be obtained.

In some embodiments, one or more surfaces of an auxiliary object may be sensed and an object may be fabricated in contact with the one or more surfaces. As described above, techniques described herein may allow for fabrication of an object in contact with (e.g., on top of) an auxiliary object (an object other than the fabrication object, which may or may not have been additively fabricated). By sensing a surface of an auxiliary object, the additive fabrication device may be instructed how to fabricate a chosen object in contact with the surface by, for example, transforming a model of the chosen object such that it provides a desired interface in contact with the auxiliary object, which may include scaling, stretching, rotating and/or translating the model, and/or may include removing material from the chosen object's model such that a desired interface is formed. In some embodiments, a model of a chosen object may be automatically transformed so that it interfaces with a sensed surface of an auxiliary object.

In some embodiments, a build surface on which objects may be fabricated may be sensed. Adjustments of the orientation and/or position of the build surface may thereby be performed to provide a desired platform on which to perform fabrication. For example, the build surface may be adjusted so that it is substantially flat with respect to gravity and/or substantially flat with respect to one or more elements of the additive fabrication device (e.g., a frame, a direction of motion of a print head, etc.). Additionally, or alternatively, by sensing a build surface, the additive fabrication device may be instructed how to fabricate a chosen object in contact with the surface, such as by filling in small imperfections in the surface during formation of initial layers of an object.

Following below are more detailed descriptions of various concepts related to, and embodiments of, using machine vision within an additive fabrication device to provide feedback during one or more stages of fabrication. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 depicts an illustrative system suitable for practicing machine vision within an additive fabrication device, according to some embodiments. System 100 includes machine vision system 110, build platform 120 and printhead assembly 130. In the example of FIG. 1, fabricated object 140 is depicted on build platform 120 to illustrate one possible location of a fabricated object in system 100. However, object 140 is provided merely as an illustrative element and system 100 may in general be used to sense a surface when no object is present on the build platform (e.g., the build platform itself may be analyzed via machine vision), by sensing a partially fabricated object present on the build platform, and/or by sensing an auxiliary object (e.g., an object not formed via additive fabrication) present on the build platform. A "partially fabricated object" as referred to herein may include any amount of material formed by the additive fabrication device, which need not be an integer number of layers of material, and may include less than one layer of material.

In the example of FIG. 1, machine vision system 110 is an Optical Coherence Tomography (OCT) scanner and includes light source 111, polarizers 112 and 113, beam splitter 114, mirror 115 and imaging device 118. Light source 111 may emit light of a fixed wavelength and/or may be configured to be controlled such that the wavelength of light emitted may be varied. Light from light source 111 is polarized by polarizer 112 and split by beam splitter 114 such that a portion (e.g., half) of the light is reflected to fabricated object 140 and another portion transmitted to mirror 115. At least some of the portion of the light that is reflected to the fabricated object is transmitted back to the imaging device 118 (e.g., by reflection). Simultaneously, light transmitted through beam splitter 114 is reflected from mirror 115 and reflected by the beam splitter to be received at imaging device 118. When the path lengths of the two light paths match, there will be constructive interference at the imaging device.

In some use cases, a distance from the imaging device to one or more points on the fabricated object may be determined by varying the distance to the fabricated object and identifying a depth at which constructive interference occurs (e.g., by producing an image using imaging device 118 and by examining the variation of the brightness of pixels of the image with the varying distance). In other use cases, a distance from the imaging device to one or more points on the fabricated object may be determined by varying the wavelength of light emitted from the light source 111 while keeping the distance from the device to the fabricated object fixed. These two techniques for determining distances from the imaging device to one or more points on the fabricated object (i.e., the varying the relative position technique and the varying the wavelength technique) may be used independently, or in conjunction, and system 100 may be configured to utilize either or both techniques.

Machine vision system 110 may have any suitable position (e.g., x and/or y) and/or depth (e.g., z) resolution, though preferably has a resolution that is comparable to a resolution of an additive fabrication technique being used in system 100, or smaller. For example, if an additive fabrication technique has a resolution of around 30 μm, a resolution of the machine vision system 110 may have any suitable size, but is preferably around 30 μm or less. In some embodiments, the machine vision system 110 has a resolution between 5 μm and 30 μm, including between 10 μm and 20 μm, such as 12.7 μm.

Machine vision system 110 may receive surface sensing data from any suitable area of a surface at a given time, which need not be the entire size of the surface. For example, machine vision system 110 may receive surface sensing data from a portion of a surface, may move the machine vision system and surface relative to one another (e.g., by moving either or both), and then may receive surface sensing data from another position of the surface. In such use cases, the area sensed may be of any suitable size, including between 50 mm³ and 500 mm³, including between 100 mm³ and 200 mm³. In some embodiments, the area sensed is a circular area having a diameter of 15 mm. In some embodiments, the machine vision system determines surface sensing data from a region of a surface defined by a binary mask.

In some embodiments, a distance between the imaging device and a surface being sensed (e.g., build platform 120, fabricated object 140, etc.) is varied at least in part by moving the build platform towards and/or away from the machine vision system 110. For example, the build platform may be moved towards and/or away from the imaging device 118 by moving the build platform in the ±z direction (see axes in FIG. 1). The build platform may be moved in any suitable way, including by using one or more actuators (e.g., motors, such as stepper motors) mechanically coupled to the build platform.

In some embodiments, a distance between the imaging device and a surface being sensed is varied at least in part by moving the machine vision system 110 towards and/or away from the build platform. For example, the machine vision system 110 may be mounted to a structure (not shown in FIG. 1) such that the machine vision system may be moved in the ±z direction. The machine vision system may be moved in any suitable way, including by using one or more actuators.

Irrespective of whether the machine vision system and/or the build platform is moved, the distance moved between images captured by the imaging device 118 may be any suitable distance. In some embodiments, a plurality of images are captured by the imaging device wherein the distance between the machine vision system and the build platform is adjusted between images in steps of between 1 µm and 10 µm, such as a step of 2 µm.

Light source 111 may include any suitable light source for use with OCT scanning. In some embodiments, light source 111 is a light emitting diode (LED). The light source may emit light over any suitable wavelength range, which, in some use cases, may be chosen based on a desired resolution of the machine vision system. For example, a light source emitting a comparatively wider range of wavelengths may allow a determination of a distance between the imaging device and a surface being sensed as being within a comparatively wider range of distances, but may have a comparatively larger resolution (i.e., greater step size in distance measurements). Similarly, a light source emitting a comparatively narrower range of wavelengths may allow a determination of a distance between the imaging device and a surface being sensed as being within a comparatively narrower range of distances, but may have a comparatively smaller resolution (i.e., smaller step size in distance measurements). In some embodiments, a spectrum of light emitted by light source 111 may be varied between scans of a surface. In some embodiments, a spectrum of light emitted by light source 111 includes non-visible radiation (e.g., infrared, ultraviolet, x-ray, etc.).

Polarizers 112 and 113 may reduce light density produced by the light source 111 and/or received by imaging device 118. The imaging device may be any suitable light sensor, such as an active pixel sensor or charge-coupled device (CCD) and may have any suitable resolution. In some use cases, the imaging device 118 may be used to sense a surface without activation of light source 111, e.g., by photographing a surface such as the build platform and/or a fabricated object using another light source, such as an ambient light source. Some techniques of determining a depth, such as depth from focus, may thereby be performed using system 100 without modification.

Printhead assembly 130 includes printheads 131, which include nozzles 132. In the example of FIG. 1, printheads typically used in ink jet additive fabrication techniques are illustrated, although it will be appreciated that any type of additive fabrication technique may in general be practiced using the machine vision techniques described herein. Moreover, the machine vision techniques described herein may be used with additive fabrication devices comprising any number of printheads, and the illustrative printhead assembly 130 is shown having three printheads merely as an example.

Printhead assembly 130 may be coupled to a structure (not shown) that enables the printhead to move in one or more directions, such as in the ±x, ±y and/or ±z directions. For example, the printhead assembly may be coupled to a rail aligned in the ±x direction and may be moved along the rail using one or more actuators. In addition, printheads 131 may each be coupled to an electrical system that actuates the printheads so that the printhead produces material. For example, printheads 131 may include a piezoelectric material that changes size and/or shape, and thereby causes a change in pressure inside the printhead, when a voltage is applied to the piezoelectric material. Ink located within the printhead can thereby be forced out through the corresponding nozzle. In some use cases, the voltage may control the size and/or velocity of ejected ink droplets. In some embodiments, droplets are ejected by a printhead that are between 6 pL and 26 pL in volume.

Build platform 120 may be any suitable surface on which an object may be fabricated. Build platform 120 may be substantially flat so that layers of material may be formed during additive fabrication in evenly sized layers. In some embodiments, build platform 120 may be configured to move in one or more directions. For example, as discussed above, the build platform may be configured to move in the ±z direction (e.g., to adjust the distance between the build platform and machine vision system 110 during sensing of a surface). Additionally, or alternatively, build platform 120 may be configured to move in one or more additional directions. For example, build platform 120 may move in the ±x and/or ±y directions.

In some embodiments, build platform 120 is configured such that a part of the build platform may be raised and/or lowered in the ±z direction. For example, one corner of the build platform may be raised and/or lowered independently, thereby providing a mechanism to adjust the orientation of the plane of the build platform. Any number of such independent mechanisms to adjust the build platform may be provided, such that the build platform can be adjusted to have an arbitrary orientation within some bounding range of orientations. In some use cases, build platform 120 is adjusted to be parallel to both the x and y axes.

As discussed above, sensing of a partially fabricated object or fabricated object on build platform 120 by machine vision system 110 may indicate an accuracy of the additive fabrication device. Accordingly, one or more aspects of printheads 131 may be adjusted by sensing a partially fabrication object or fabricated object and determining how to adjust those aspects based on a result of the sensing. For example, sensing a fabricated object may indicate that material in the fabricated object is situated at a different position than intended. As a result, a printhead that formed the fabricated object may be adjusted to produce material in the intended position, such as by adjusting a position and/or orientation of a nozzle of the printhead.

Any one or more of machine vision system 110 (including any of its components), build platform 120, printhead assembly 130, printheads 131 and/or nozzles 132 may be controlled by one or more controllers (not shown in FIG. 1). The one or more controllers may be coupled to any number of the above elements. For example, the imaging device 118 may be controlled by a different controller than controls a position of the machine vision system 110 (and which may, or may not, be coupled to one another), or may be controlled by the same controller. Furthermore, any number of controllers may perform any calculations and/or determinations described herein, such as how to adjust one or more positions and/or configurations of the elements, as described further below.

Figure 2:
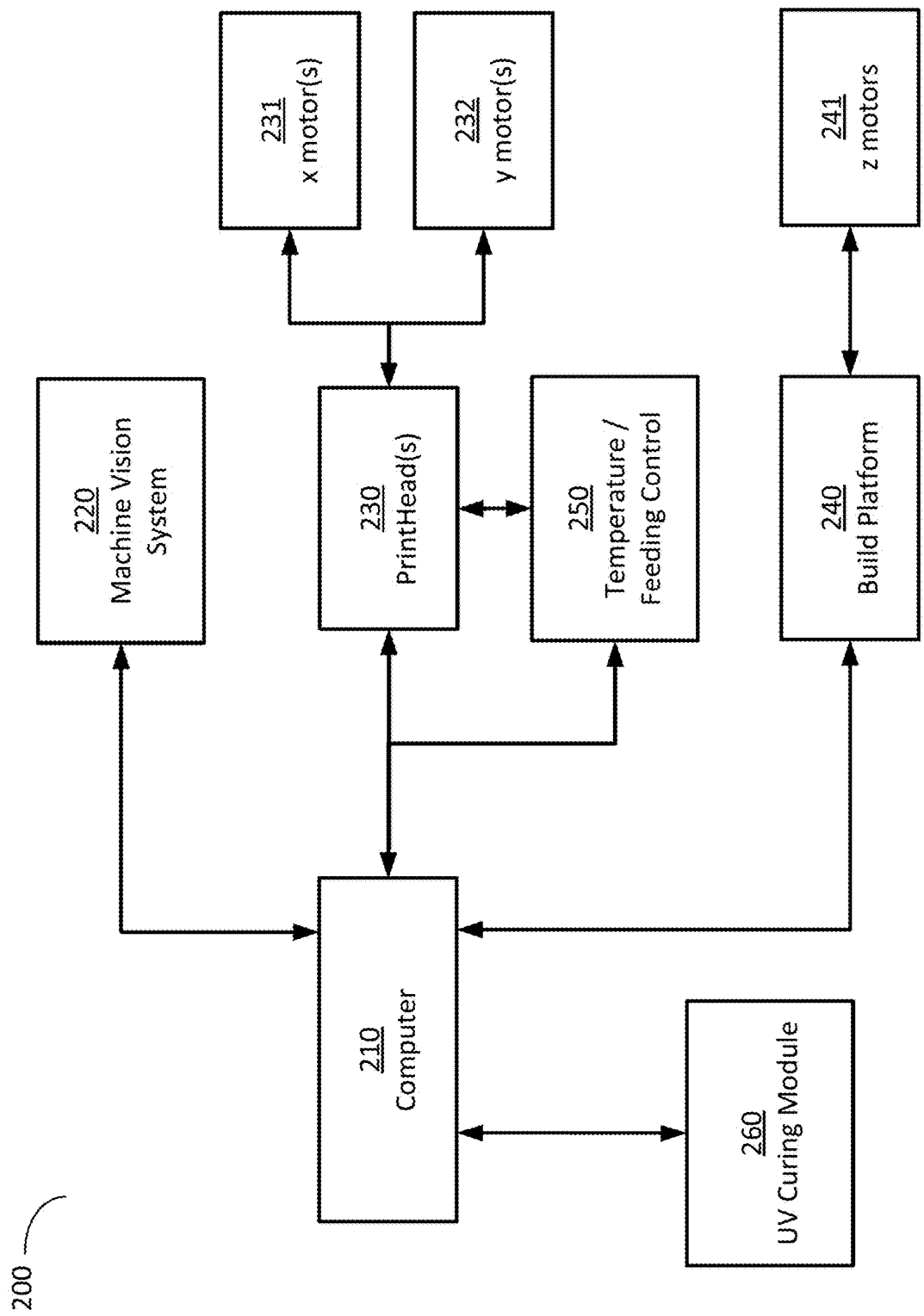
FIG. 2 depicts a logical diagram of a system suitable for practicing machine vision techniques, according to some embodiments.

FIG. 2 depicts a logical diagram of a system suitable for practicing machine vision techniques, according to some embodiments. System 200 includes computer 210, machine vision system 220, printhead(s) 230, build platform 240, temperature/feeding control 250 and UV curing module 260. FIG. 2 illustrates an illustrative ink jet additive fabrication system that includes one or more printheads 230 and has a particular illustrative configuration for moving components during fabrication and sensing of a surface via machine vision system 220.

Computer 210 may include any suitable computing system environment, examples of which are discussed below in relation to FIG. 14. Computer 210 may obtain data relating to an additive fabrication including, but not limited to, one or more three-dimensional models representing one or more objects to be fabricated, temperature parameters (e.g., a temperature of a printhead, a build platform, how to cool an object being fabricated, etc.), motor operation parameters (e.g., steps/mm for a stepper motor, motion speed(s)/acceleration(s), etc.), or combinations thereof. Any of the obtained data may be received from an external device (e.g., another computer) and/or read from a storage device accessible to the computer (e.g. local and/or remote storage). Computer 210 controls the other elements of system 200 by providing signals to those components via any suitable wired and/or wireless techniques. For example, any one or more of the elements of system 200 may communicate with elements to which they are coupled via USB, Ethernet and/or Wi-Fi.

In the example of FIG. 2, printhead(s) 230 (which may include one or more printheads) are moved in x and y directions (e.g., as shown in FIG. 1) by motors 231 and 232, respectively. In addition, temperature/feeding control 250 is operated by computer 210 to produce material from one or more of the printheads 230 (e.g., by actuating a motor and/or by providing a voltage across a piezoelectric material).

In the example of FIG. 2, build platform 240 is configured to move in the z direction in two ways using motors 241. Firstly, the build platform is configured to move linearly in the ±z direction (i.e., all points on the build platform are simultaneously displaced the same amount in the ±z direction). In addition, the build platform is configured to be tilted by one or more motors such that the build platform's orientation with respect to the z-axis is adjusted. For example, the build platform may be coupled to a plurality of screw drives each coupled to a stepper motor, which may be actuated independently to adjust the orientation of the build platform.

In the example of FIG. 2, an ink jet additive fabrication device produces liquid photopolymer via printhead(s) 230, which is cured into a solid form by exposure to UV radiation. UV curing module 260 is controlled to cure the photopolymer produced by the printhead(s) 230.

Figure 3:
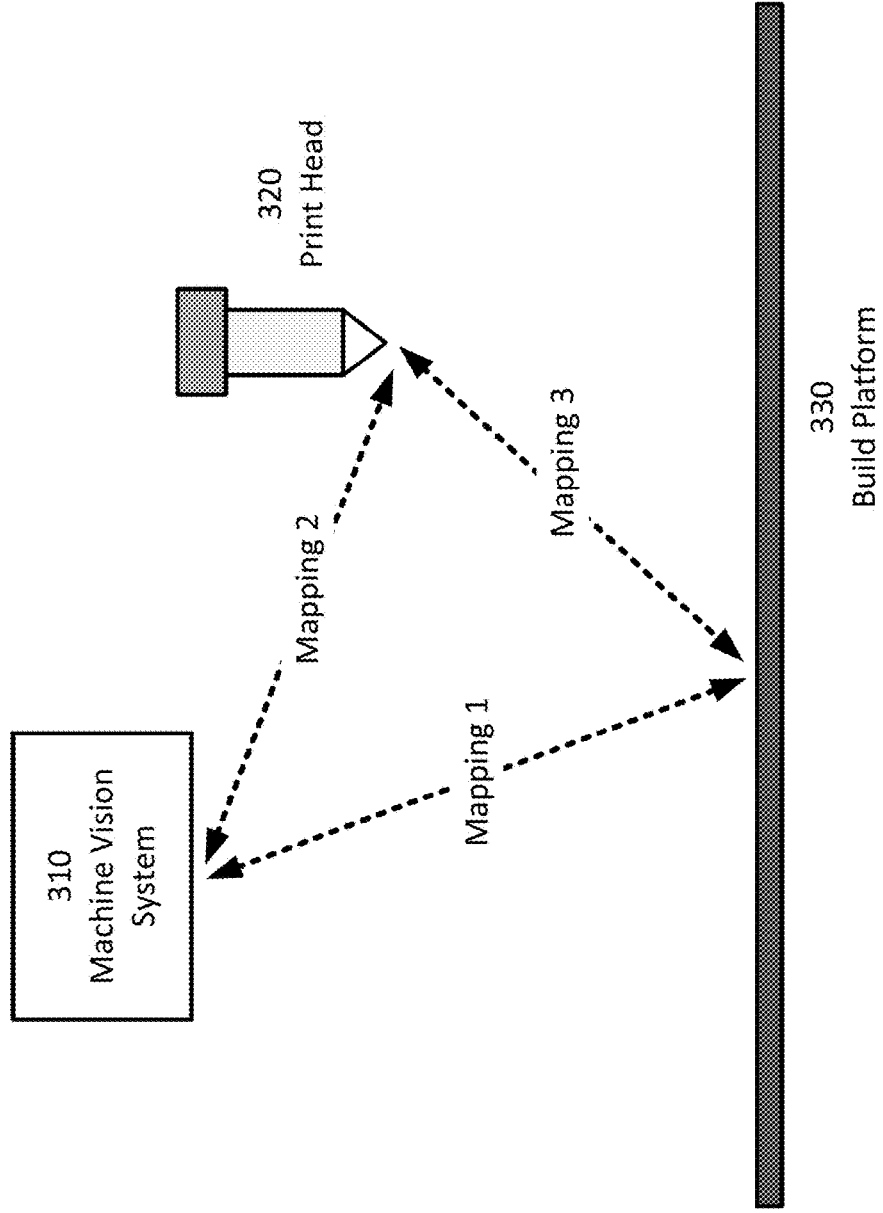
FIG. 3 depicts determination of spatial mappings between components of a machine vision assisted additive fabrication device, according to some embodiments.

FIG. 3 depicts determination of spatial mappings between components of a machine vision assisted additive fabrication device, according to some embodiments. As discussed above, sensing of a known fabricated object on a build platform via a machine vision system may indicate how the fabricated object was actually formed compared with how it was intended to be formed. FIG. 3 depicts an illustrative technique for understanding observations made by a machine vision system of a fabricated object on a build platform when produced by a printhead. Observations made by the machine vision system may indicate where, in some coordinate system, the observed material was located, but this coordinate system is not necessarily the same as the one that the printhead uses to move around and to deposit material. Accordingly, to understand whether the printhead is producing material as intended, relationships between the coordinate systems of the printhead, machine vision system and build platform may be determined.

System 300 includes machine vision system 310, printhead 320 and build platform 330. Mapping 1, which indicates the position of the machine vision system in the build platform's coordinate system, may be determined by sensing a known pattern and/or object on the build platform. For example, a piece of paper having a pattern (e.g., a checkerboard pattern) may be imaged by the machine vision system (e.g., using an imaging device, such as a camera) and the mapping determined based on an observed position, size and/or focus state of the pattern. Additionally, or alternatively, an object (e.g., an additively fabricated object) of known size and shape may be sensed by the machine vision system 310 and the mapping determined based on an observed position, size and/or focus state of the object. Mapping 1, as well as mappings 2 and 3 described below may be described in any suitable way, such as with a homography matrix. Moreover, mappings 1-3 may be determined based on any number of measurements described herein. For example, it may be beneficial, in some use cases, to perform multiple measurements as described herein and perform an average or other numerical combination of the measurements to determine a mapping.

Mapping 2 indicates a mapping between the printhead 320 and the machine vision system 310. Once mappings 1 and 2 have been determined, mapping 3 can be calculated to determine the position of the printhead 320 in the build platform's coordinate system. To determine mapping 2, a known object may be fabricated on the build platform using printhead 320. For example, a grid having a known size may be fabricated from any number of layers of material. The grid may then be sensed by machine vision system 310 (e.g., by photographing and/or by sensing a shape/position of one or more surfaces) and to determine where in the machine vision system's coordinate system the fabricated object is located. This enables a determination of mapping 3 by transforming the determined positions of the fabricated object using mapping 1.

In some embodiments, printhead 320 may be one of a plurality of printheads in an additive fabrication device. In such cases, the above process of determining mappings 2 and 3 may be repeated for each of the printheads to determine corresponding mappings for each of the printheads. Alternatively, where there are more than two printheads in a known configuration, the process of determining mapping 3 may be performed for a portion of the printheads using the above process, and mapping 3 for the remainder of the printheads may be determined by interpolating the mappings for the portion. For example, for a row of printheads, the mapping for the first and last printheads in the row may be determined by the above-described processes, and mappings for each of the other printheads may be determined by interpolating between the mappings for the first and last printheads based on the position of each printhead in the row.

Once a mapping for printhead 330 has been determined (and for other printheads, if appropriate), one or more settings associated with the printhead may be adjusted based on the determined mapping. If the mapping indicates that the printhead is not forming material in the intended location, the additive fabrication device may be adjusted to produce material in the intended manner. For example, a mechanical adjustment may be made, such as moving and/or reorienting a nozzle of printhead 330 to adjust where the printhead deposits material. Additionally, or alternatively, one or more settings stored in a computer readable medium and accessed by one or more controllers that control the additive fabrication device may be adjusted so that subsequent fabrication produces material as intended.

In some embodiments, one or more of mappings 1 and 2 may be determined based at least in part on input provided by a user via a user interface. While each of the mappings may be determined automatically based on data obtained by the machine vision system, the mapping may also be determined at least in part based on input from a user. For example, a user may indicate, via a user interface, where known aspects of the calibration object are positioned. These indications may alone, or in combination with automatically recognized features of the object, be used when determining mapping 1 and/or mapping 2.

Figure 4:
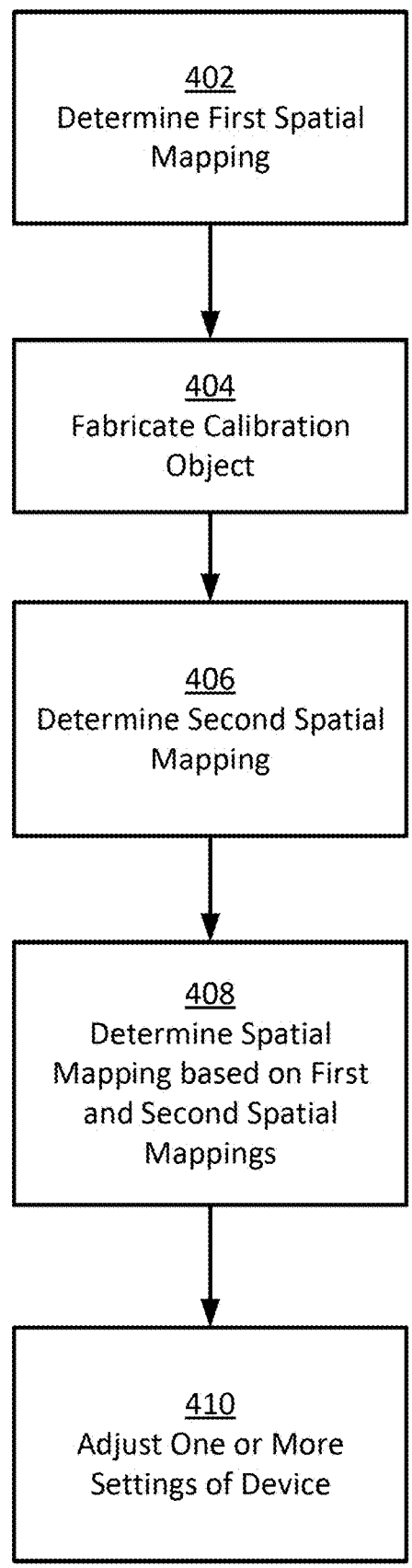
FIG. 4 depicts a method of adjusting one or more settings of an additive fabrication device, according to some embodiments.

FIG. 4 depicts a method of adjusting one or more settings of an additive fabrication device, according to some embodiments. Method 400 may be performed by any additive fabrication device comprising a machine vision system, including but not limited to systems 100 and 200 shown in FIGS. 1 and 2, respectively. Method 400 performs a calibration process such as that described above in relation to FIG. 3, in which a spatial mapping is determined between a printhead and a machine vision system, and one or more settings of the additive fabrication device are adjusted based on the spatial mapping.

In act 402, a first spatial mapping is determined. The first spatial mapping may be a mapping from the machine vision system to a surface that may be sensed by the machine vision system, such as a build platform or an object (e.g., sheet of paper, fabricated object) on the build platform. In act 404, a calibration object is fabricated by the printhead of the additive fabrication device. The calibration object may be any object with at least one known spatial characteristic, such as at least one known length.

In act 406, a second spatial mapping is determined by sensing the fabricated calibration object using the machine vision system. For example, the machine vision system may identify a position of the one or more known spatial characteristics of the calibration object. In act 408, a spatial mapping between the printhead and the machine vision system is determined based on the first and second spatial mappings. In act 410, one or more settings of the additive fabrication device are adjusted based on the spatial mapping determined in act 408, examples of which are discussed above.

Figure 5:
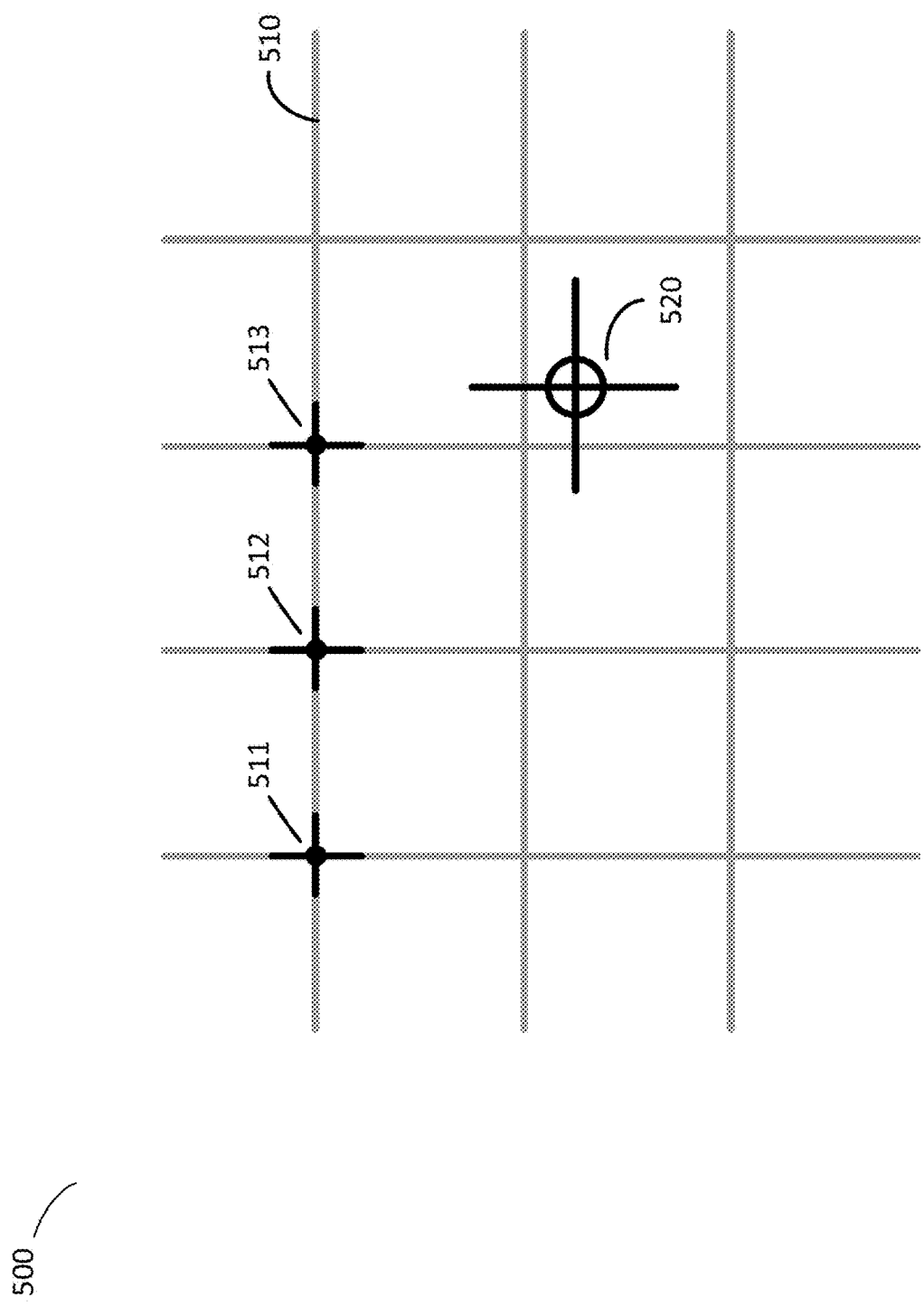
FIG. 5 depicts an illustrative user interface suitable for determining a spatial mapping for an additive fabrication device, according to some embodiments.

FIG. 5 depicts an illustrative user interface suitable for determining a spatial mapping for an additive fabrication device, according to some embodiments. As discussed above, a mapping may be determined based at least in part on input provided by a user via a user interface. FIG. 5 depicts an illustrative user interface in which an image of a calibration object is displayed (e.g., by sensing the calibration object via a machine vision system), and a user may indicate, via a cursor, where known spatial characteristics of the calibration object are located.

Interface 500 includes an image of a calibration object 510, wherein the calibration object includes a grid shape. A user manipulates cursor 520 to intersecting grid lines of grid 510 and indicates their location by providing input with the cursor at that location (e.g., clicking a mouse button). In the example of FIG. 5, intersections 511, 512 and 513 have already been identified by the user. Once the user has identified a number of the intersections, a mapping of the printhead which fabricated the grid lines to the build platform may be determined, as described above.

Figure 6B:
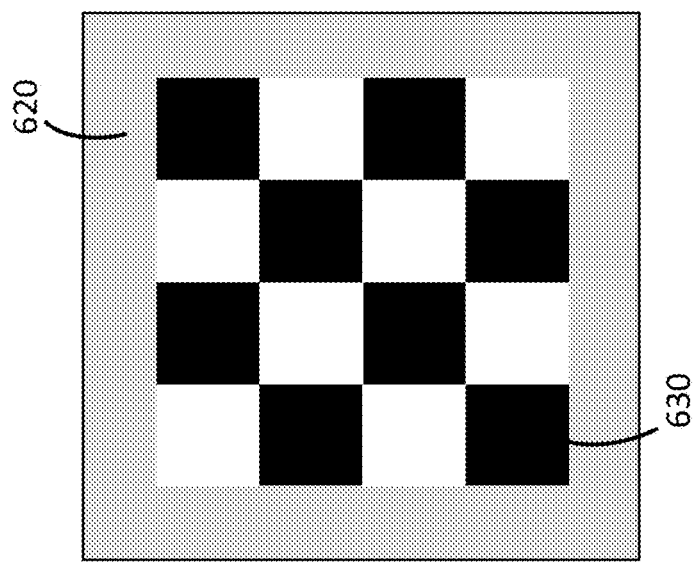
FIGS. 6A-B depict an illustrative technique for sensing an orientation of a build platform, according to some embodiments.
Figure 6A:
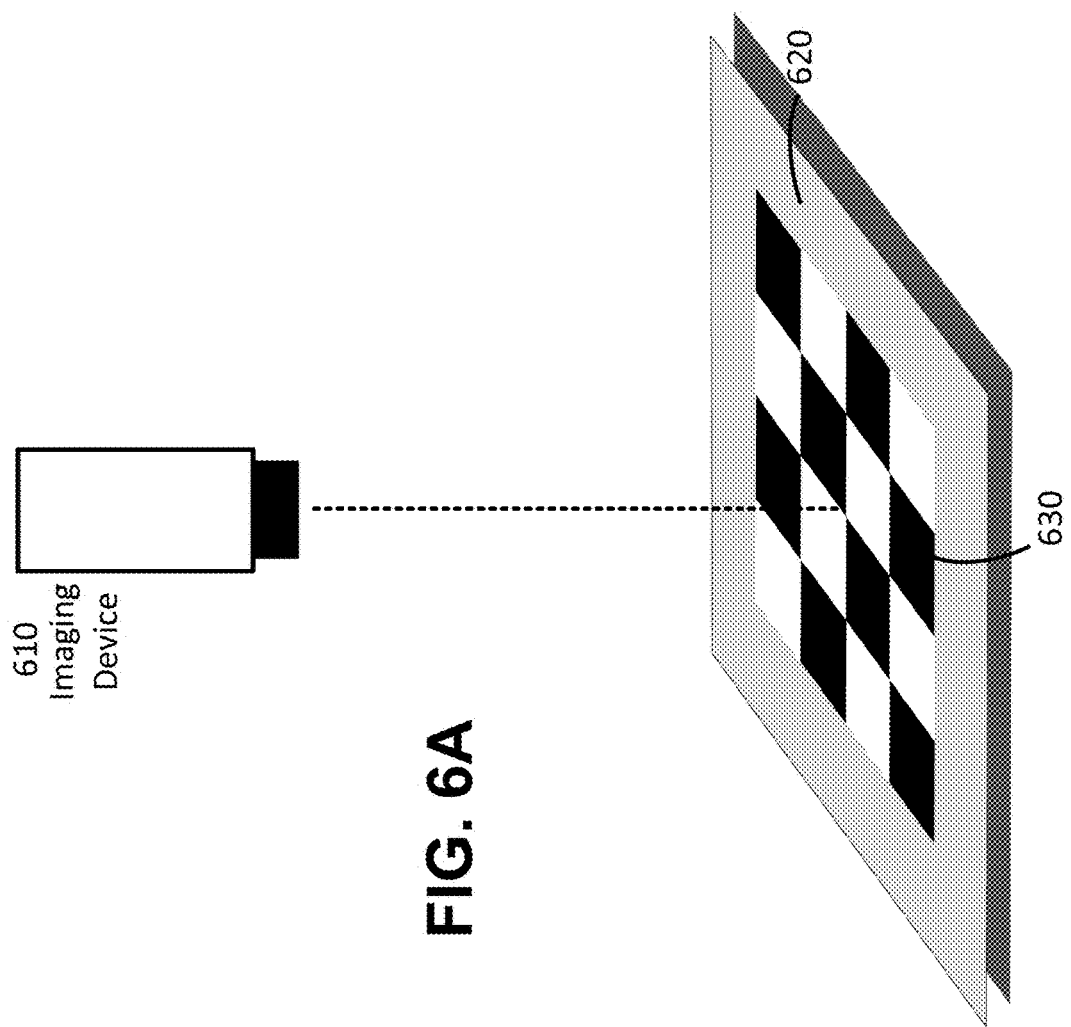

FIGS. 6A-B depict an illustrative technique for sensing an orientation of a build platform, according to some embodiments. As described above, a machine vision system may sense an orientation of a build platform by forming an image of a pattern on the build platform. FIG. 6A depicts an illustrative additive fabrication device that includes imaging device 610 and build platform 620. On build platform 620 is calibration pattern 630, which in the example of FIGS. 6A-B is a checkerboard pattern. FIG. 6B depicts the build platform 620 viewed from above (e.g., from the perspective of the imaging device).

Calibration pattern 630 may be any suitable object having a known pattern in a known size and/or shape. In the example of FIGS. 6A-B, calibration pattern 630 may be a piece of paper or may be an additively fabricated object. Calibration pattern 630 preferably has a constant thickness in the z-direction.

The machine vision system that includes imaging device 610 may determine the orientation of build platform 620 in any suitable way, including by detecting a focus of one or more regions of an image of calibration pattern 630. For example, if a first region of the image is out of focus and a second region of the image is in focus, that implies that the first region is either nearer or further from the imaging device than the second region. By adjusting the orientation of the build platform and obtaining further images, the build platform may be adjusted until it is perpendicular to the axis between the imaging device and the build platform.

Figure 7:
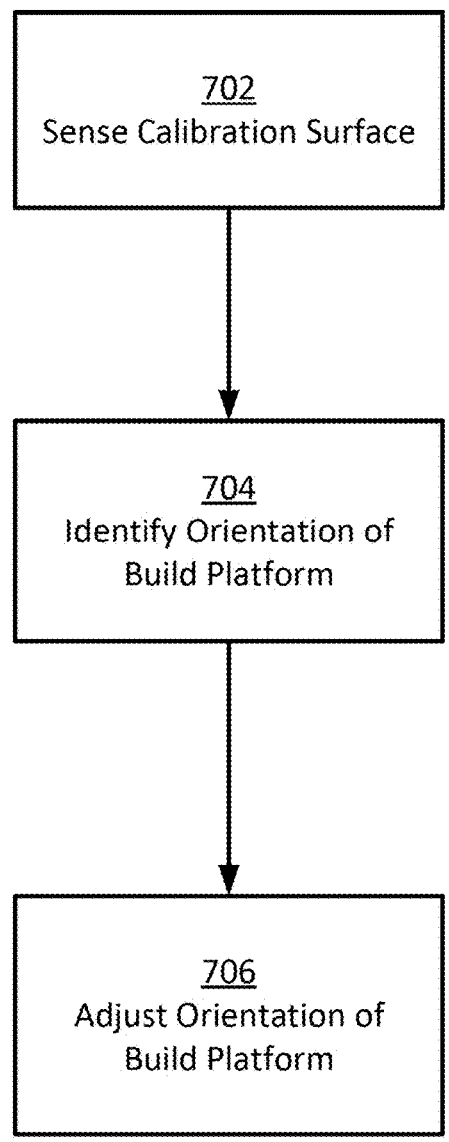
FIG. 7 depicts a method of adjusting orientation of a build platform, according to some embodiments.

FIG. 7 depicts a method of adjusting orientation of a build platform, according to some embodiments. Method 700 may be performed by any additive fabrication device comprising a machine vision system, including but not limited to systems 100 and 200 shown in FIGS. 1 and 2, respectively. Method 700 performs a calibration process such as that described above in relation to FIG. 6, in which an orientation of a build platform is determined and the orientation is adjusted based on the determined orientation.

In act 702, a calibration surface is sensed by a machine vision system. Any suitable calibration surface may be sensed such that information regarding an orientation of the build platform may be obtained from one or more results of the sensing. Examples of sensing of a calibration surface include, but are not limited to: a calibration surface having various hues and/or colors (e.g., may be a piece of paper or plastic with an image formed on it), and sensed by photographing the calibration surface; the calibration surface is a surface of an object located on the build platform and the surface may be sensed by the machine vision system; and/or the calibration surface may be the build platform, and a distance to the build platform may be sensed by the machine vision system.

In act 704, the orientation of the build platform is identified based at least in part on a result of act 702. Any suitable technique(s) may be used to identify the orientation of the build platform, which may be dependent upon the type of sensing performed in act 702. For example, where a calibration surface having various hues and/or colors was photographed in act 702, one or more measurements of the focus of the photograph may be used to determine whether the calibration surface, and thereby the build platform, is oriented as intended. Where, for example, a calibration surface is a surface of an object located on the build platform or the build platform itself, a depth map of the surface or build platform, respectively, may be obtained and used to identify the orientation of the build platform. Additionally, or alternatively, a shape from specularity technique may be used to observe how light reflects from one or more points on the object and identify the orientation of the object based on the observed reflected light, if any.

Any suitable orientation may be chosen as an intended orientation, although preferably the intended orientation is one in which the build platform is parallel to axes in which one or more printheads of the additive fabrication device move. Such an orientation ensures that layers of constant thickness may be formed by the one or more printheads.

In act 706, the orientation of the build platform may be adjusted. The orientation may be adjusted via any suitable means, including one or more manually operated actuators (e.g., screws) or one or more motor driven actuators (e.g., a drive screw driven by a motor).

Figure 8:
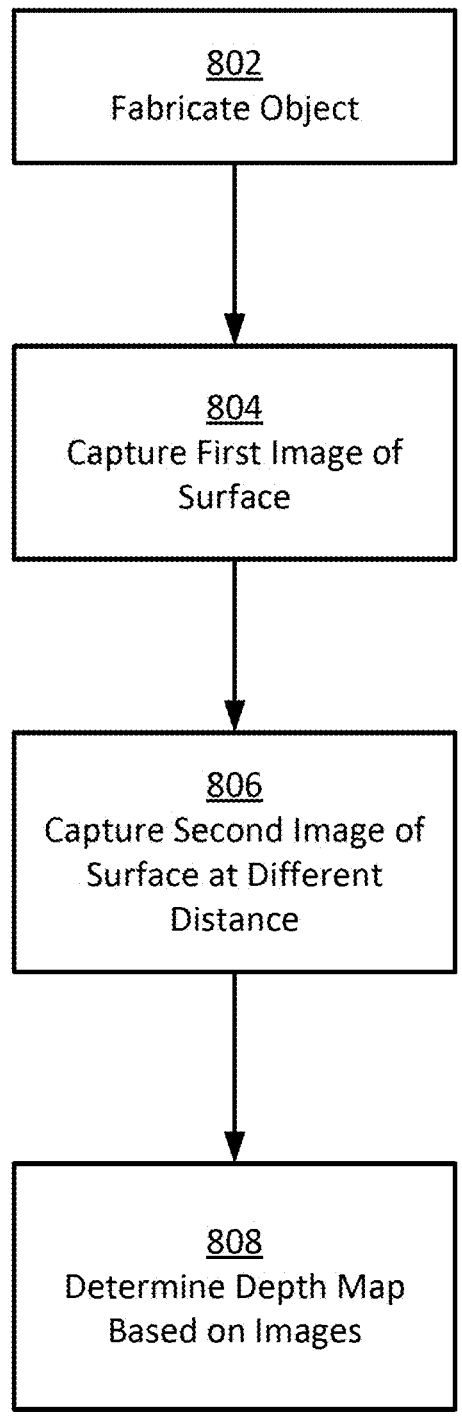
FIG. 8 depicts a method of determining a depth map of a surface, according to some embodiments.

FIG. 8 depicts a method of determining a depth map of a surface region of an object, according to some embodiments. Method 800 may be performed by any additive fabrication device comprising a machine vision system, including but not limited to systems 100 and 200 shown in FIGS. 1 and 2, respectively. Method 800 performs a process in which an object fabricated via additive fabrication is imaged at two different relative distances from an imaging device of the machine vision system to the object, and determines a depth map based at least on the two images.

In act 802, an object is fabricated via additive fabrication. Subsequent acts of method 800 may use an additive fabrication device that includes a machine vision system. In such cases, act 802 may be performed by that additive fabrication device or by any other suitable additive fabrication device. For example, the object fabricated via additive fabrication may be an auxiliary object that is subsequently sensed by an additive fabrication device having a machine vision system, which may be a different additive fabrication device than was used to fabricate the auxiliary object.

In act 804, a first image of a surface region of the object fabricated in act 802 is captured. The image may be captured in any suitable way, and may be based on any suitable radiation directed from the surface region of the object to an imaging device of the machine vision system. In some embodiments, light from a light source is directed to the surface region of the object and reflected, at least in part, to the imaging device. For example, a shape from specularity technique may be used in which an image is taken of the surface region under illumination. Additionally, or alternatively, a tomographic technique such as terahertz imaging and/or OCT may be used to capture the first image. For example, an OCT scanner, such as depicted in FIG. 1, may direct light to the surface region of the object and capture an image at an imaging device based on reflected light in addition to light that follows an alternate path (e.g., via a mirror) to the imaging device. In some embodiments, the first image of the surface region may be one of a plurality of images of the surface region that are captured at the same distance from the imaging device. For example, in a shape from specularity technique, a number of images of a surface region may be captured while varying the illumination of the surface region. The surface region imaged in acts 804 and 806 may be any exterior portion of the object, and need not include flat surfaces nor contiguous surfaces of the object. Additionally, or alternatively, the surface region may be a region of a surface which extends outside of the region (e.g., a portion of a flat surface).

In act 806, a second image of the surface region of the object is captured, where the distance from the imaging device that captures the image to the surface region of the object is different from the distance between them when the first image was captured. The distance may be varied in any suitable way, and using any suitable mechanism, including by moving the imaging device and/or by moving the object (which may include moving a platform or other structure on which the object rests or is otherwise attached). In some embodiments, adjustment of the distance between acts 804 and 806 comprises moving the object and/or imaging device in a direction parallel to a principal axis of the imaging device. However, in general the distance between the surface region and imaging device may be varied in any suitable way. In some embodiments, the second image of the surface region may be one of a plurality of images of the surface region that are captured at the same distance from the imaging device.

In act 808, a depth map is determined based on at least the first and second images. A depth map may indicate a distance from the imaging device to the surface region of the object imaged in acts 804 and 806 at a plurality of locations within the surface region. A depth map may thereby, in some use cases, be represented by an image with each pixel having a brightness and/or color that is indicative of the depth of an associated point of the surface of the object.

In some embodiments, a binary mask may be applied to the determination of the depth map such that only locations within the binary mask when applied to points within the sensing range of the machine vision system are sensed. This technique may be used to reduce the time taken to determine a depth map where only a particular region, defined by the binary mask, is of interest.

As a non-limiting example of the determination of a depth map in act 808, an OCT scanner may illuminate a surface region of an object (e.g., a circular region of a surface) and capture a first image based on that surface region. The distance between the OCT scanner and the surface may be moved, and at least a second image based on the same surface region may be imaged at a different distance. As discussed above, a distance at which constructive interference occurs may indicate the distance to a corresponding position in the surface region. Accordingly, a depth map may be determined by examining a plurality of the images of the surface region, including at least the first and second images.

Figure 9:
FIG. 9 depicts an illustrative depth map of a U.S. 1 cent piece, according to some embodiments.

FIG. 9 depicts an illustrative depth map of a U.S. 1 cent coin, according to some embodiments. As discussed above, in some embodiments a depth map may indicate a distance from a machine vision system (and/or of a particular component of the machine vision system, such as an imaging device) for a plurality of locations on a surface of an object. FIG. 9 depicts an illustrative depth map of a U.S. 1 cent coin where the relative brightness of each pixel of the depth map indicates a height above a baseline height. For example, President Lincoln's head is the brightest, and therefore the highest, region of the coin. Regions that appear black are the lowest regions of the depth map. Illustrative depth map 900 may have been generated via any suitable technique described herein, included but not limited to Optical Coherence Tomography, shape from specularity, terahertz imaging, etc.

FIGS. 10A-B depict an example of performing additive fabrication in response to sensing of a surface of an object being fabricated, according to some embodiments. As discussed above, sensing of a surface of an object during fabricated may inform subsequent fabrication of that object. In particular, where less material has been formed than intended, additional material may be provided in one or more subsequent layers, and/or where more material has been formed than intended, less material may be provided in one or more subsequent layers. FIGS. 10A-B depict an illustrative process of fabricating a portion of an object, sensing a surface of the object, and forming additional material in response to the sensing of the surface. Both FIGS. 10A and 10B depict a cross-section of a build platform and an object during fabrication.

In FIG. 10A, an additive fabrication device includes build platform 1020 on which a portion of an object 1010 has been formed. The object portion 1010 has been formed in layers, which are not shown, although object portion 1010 as depicted may represent any number of layers of material. Level 1030 is a height above the build platform at which the upper surface of object portion 1010 is expected to be at the depicted stage in the fabrication process. However, regions 1011 and 1013 have more material than intended, and consequently reach higher than level 1030, and region 1012 has less material than intended, and does not reach level 1030.

An upper surface of object portion 1010 may be sensed by any suitable machine vision system, examples of which are described herein. Accordingly, the discrepancies between the intended amount of material in the partial object and the actual deposited material in regions 1011-1013 may be determined. As a result, subsequent formation of material that might otherwise be performed to continue fabrication of the object may be adjusted to compensate for any observed discrepancies. For example, in one or more subsequent layers, less material may be formed above region 1011 than would otherwise have been formed. Similarly, in one or more subsequent layers, more material may be formed above region 1012 than would otherwise have been formed.

In some embodiments, one or more layers may be formed that would not have been produced but for observation of the discrepancies. For example, if a discrepancy is larger than the thickness of a layer of material, it may be beneficial to form one or more layers to address the discrepancy, e.g., if the depth of region 1012 below level 1030 is roughly equal to or greater than the thickness of a layer, one or more layers may be formed in region 1012 to increase its depth toward level 1030 before additional layers of the object are formed (which may include further layers adjusted based on this and/or other discrepancies).

In FIG. 10B, one or more additional layers have been formed, depicted as object portion 1040. Level 1050 is a height above the build platform at which the upper surface of object portion 1040 is expected to be at the depicted stage in the fabrication process. Object portion 1040 has been formed so as to include additional material in region 1012 and reduced material in regions 1011 and 1013. Accordingly, object portion 1040 has an even height at level 1050.

FIGS. 10A-B are provided as one illustrative process of fabricating a portion of an object, sensing a surface of the object, and forming additional material in response to the sensing of the surface. In general, this process may be performed any number of times during fabrication of an object. In addition, the object being fabricated as depicted in FIGS. 10A-B has a rectangular cross-section to provide clarity in describing the figure. However, it will be appreciated that, in general, an object may have any arbitrary cross-section and/or shape.

Figure 11:
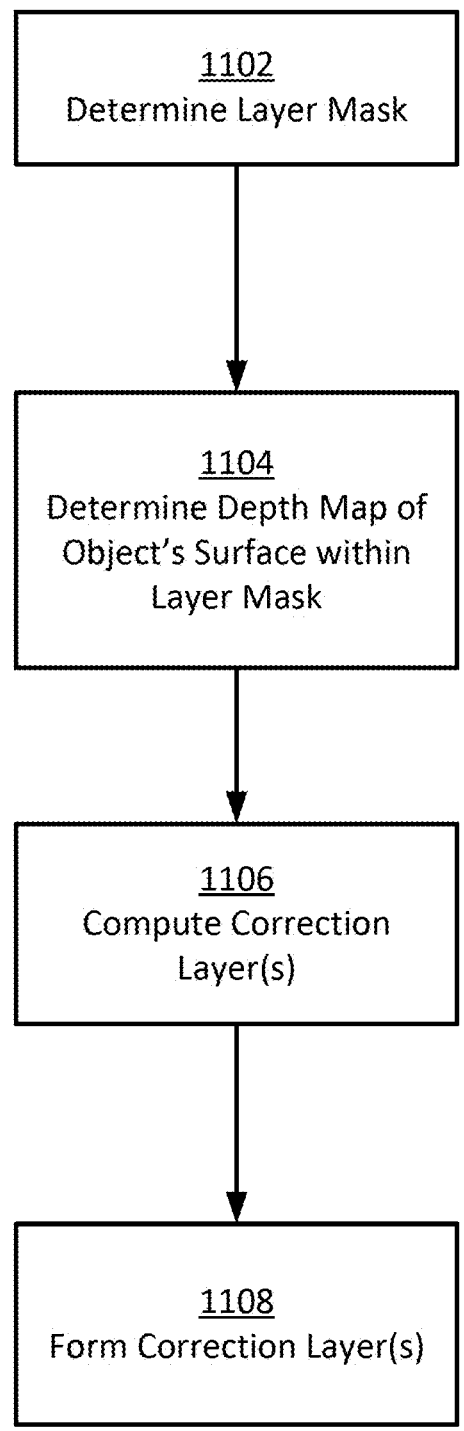
FIG. 11 depicts a method of forming a correction layer during fabrication of an object, according to some embodiments.

FIG. 11 depicts a method of forming a correction layer during fabrication of an object, according to some embodiments. Method 1100 may be performed by any additive fabrication device comprising a machine vision system, including but not limited to systems 100 and 200 shown in FIGS. 1 and 2, respectively. Method 1100 may be performed during fabrication of an object to compute one or more correction layers that may be formed in order to normalize the amount of material deposited in the partially fabricated object to an expected level. A correction layer may include a layer that is formed by adjusting a layer than would otherwise have been formed but for the sensing of the surface, and/or may include a layer formed solely to normalize the amount of material.

In act 1102, a layer mask is determined. In order to reduce the amount of time taken to sense a surface of the partially fabricated object, a binary mask may be determined to limit sensing of the surface to a region below the machine vision system that includes an upper surface of material. The layer mask may be determined via any suitable technique(s), and may be determined based at least in part on a representation of the object being fabricated. For example, since the object is fabricated in layers, the additive fabrication device and/or one or more controllers of the additive fabrication device may locations where material was formed in the most recently formed layer of the partially fabricated object. The binary mask may thereby be determined based on those locations.

In act 1104, a depth map of the partially fabricated object is determined within the region of the surface of the object defined by the layer mask. The depth map may be determined using any suitable technique(s) described herein.

In act 1106, a correction layer is determined by comparing the determined depth of each point in the depth map with the expected depth of the surface (which will typically be of a uniform depth). Each point in the depth map may be associated with a location in the coordinate system of the additive fabrication device (e.g., by determining the mappings depicted in FIG. 3) and accordingly a correction layer that at least partially corrects any discrepancies between the expected depth and the measured depth may be determined.

Any number of correction layers may be determined to correct any observed discrepancy or discrepancies. In some use cases, a discrepancy may be greater than the thickness of a layer produced by the additive fabrication device. In such cases, a plurality of correction layers may be determined to at least partially correct this discrepancy. For example, where insufficient material has been formed in a region of the object, a plurality of correction layers may be determined to fill that region until it is approximately at the intended height. Similarly, where excess material has been formed in a region of the object, a plurality of correction layers may be determined to not form material in the region until the remainder of the object has reached the approximately height of the region.

In act 1108, one or more correction layers determined in act 1106 are formed on the object. Method 1100 may be performed any number of times during fabrication of an object, including once or periodically based on the number of formed layers. For example, method 1100 may be performed once after every fifteen layers of an object have been formed.

FIGS. 12A-D depict an illustrative process of fabricating an object in contact with an auxiliary object, according to some embodiments. The process depicted in FIGS. 12A-D may be performed by any additive fabrication device comprising a machine vision system, including but not limited to systems 100 and 200 shown in FIGS. 1 and 2, respectively. As discussed above, by sensing a surface of an auxiliary object, an object may be fabricated in contact with the object. FIGS. 12A-D depict a sequence in which material is formed by an additive fabrication device on an auxiliary object.

Figure 12A:
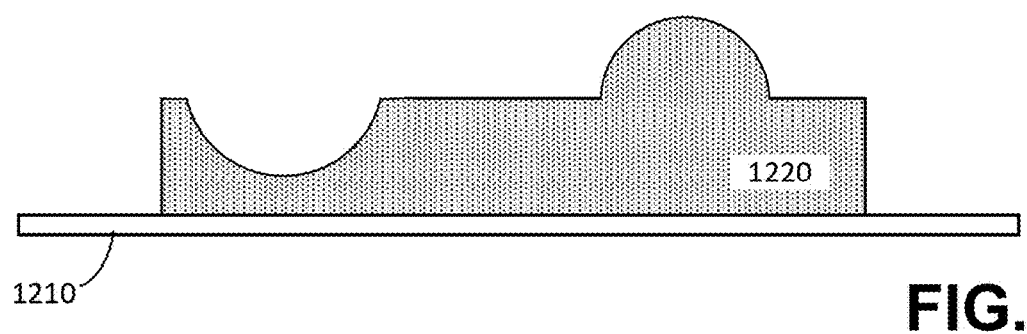
FIGS. 12A-D depict an illustrative process of fabricating an object in contact with an auxiliary object, according to some embodiments.

FIG. 12A depicts a cross-sectional view of an auxiliary object 1220 situated on a build platform 1210. The upper surface auxiliary object may be sensed via any suitable technique(s) using a machine vision system as described herein. Subsequent formation of material via additive fabrication, shown in FIGS. 12B-D, may be based at least in part on the sensing of the surface of auxiliary object 1220.

Figure 12B:
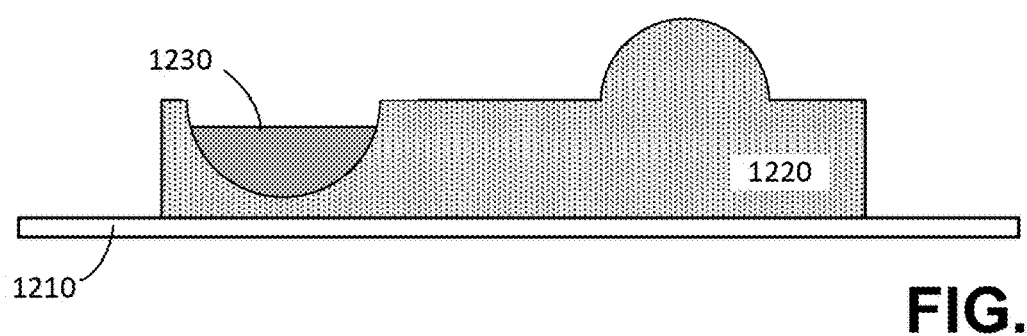
Figure 12C:
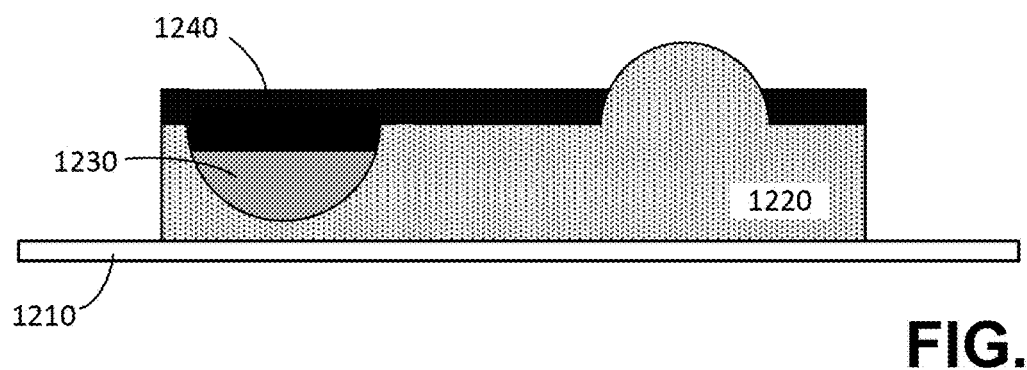

In FIG. 12B, one or more layers of material 1230 have been formed in contact with the auxiliary object 1220. How to form one or more layers of material may be determined based on a representation of the object being fabricated (in this case a cuboid) and a depth map of the auxiliary object. In some embodiments, an object being fabricated is fabricated directly onto the auxiliary object without modification. In some embodiments, an object being fabricated may be modified based on the sensed three-dimensional structure of an auxiliary object. For example, a model of the object to fabricate on the auxiliary object may be obtained by performing a subtraction of material from a target object based on a depth map (e.g., by performing one or more Boolean operations on the target object's geometry), and/or by stretching, resizing and/or translating the model.

Figure 12D:
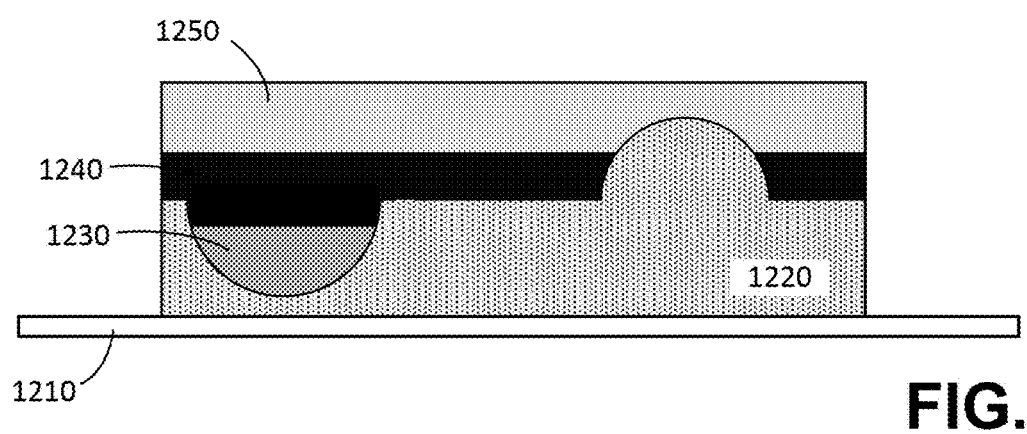

Irrespective of how the one or more layers of material are determined, they may be formed over the auxiliary object as shown by the one or more layers 1230, one or more layers 1240 (in FIG. 12C) and one or more layers 1250 (in FIG. 12D). Accordingly, as shown in FIG. 12D, an object having a rectangular cross-section may be formed by additively fabricating an object in contact with an auxiliary object having a non-rectangular cross-section.

Figure 13:
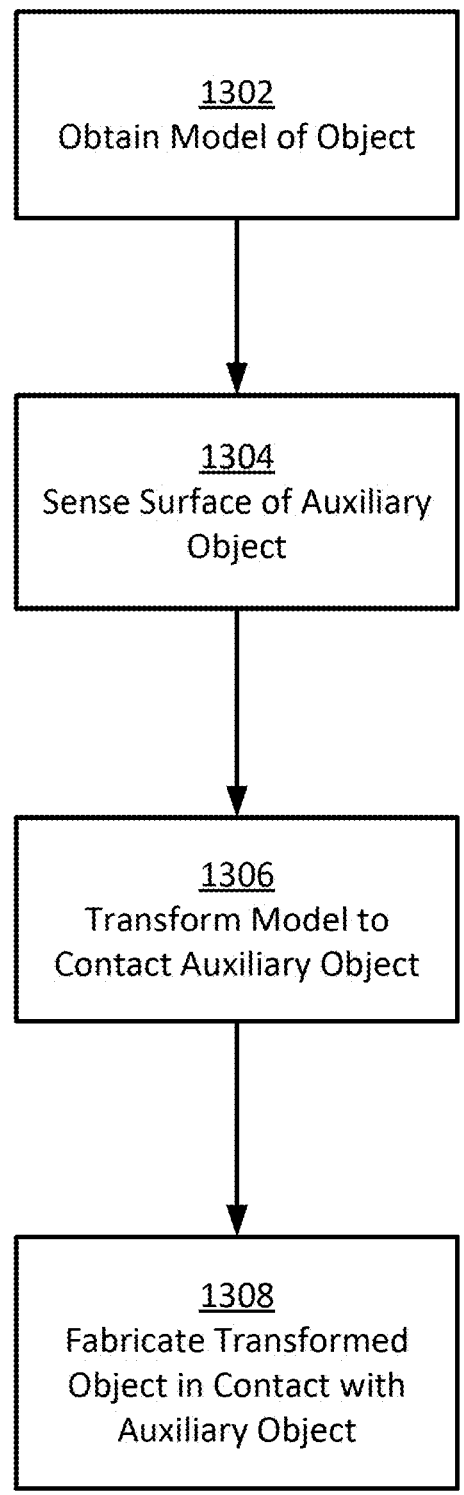
FIG. 13 depicts a method of fabricating an object in contact with an auxiliary object, according to some embodiments.

FIG. 13 depicts a method of fabricating an object in contact with an auxiliary object, according to some embodiments. Method 1300 may be performed by any additive fabrication device comprising a machine vision system, including but not limited to systems 100 and 200 shown in FIGS. 1 and 2, respectively. As discussed above, a model of an object to be fabricated in contact with an auxiliary object may be transformed prior to fabrication of the object. The example of FIG. 13 depicts an illustrative process for performing such a transformation.

In act 1302, a model of an object is obtained. The model may be any suitable computational representation of the object to be fabricated. In act 1304, a surface of an auxiliary object is sensed. The auxiliary object may be located on a build platform of an additive fabrication device including a machine vision system, which performs said sensing. Any surface region of the auxiliary object may be sensed, including all or a portion of an upper surface. For example, where the object is to be fabricated on a portion of the auxiliary object, it may not be necessary to sense the entire surface of the auxiliary object.

In act 1306, the model of the object is transformed based at least in part on a result of the sensing performed in act 1304. The object may be transformed in any suitable way, including by removing or adding portions to the object, and/or by stretching, skewing, resizing and/or translating the model. In some embodiments, a transformation may be applied to a portion of the object, while performing a different transformation, or no transformation, to the remainder of the object.

In some embodiments, a user interface may be used to perform actions that, at least in part, determine how to transform the object. For example, a user wishing to align an object's perimeter with a perimeter of an auxiliary object may use a user interface to resize and translate the model over an image (e.g., depth map) of the auxiliary object until the perimeters are aligned. Such actions may be in addition to further transformations performed automatically by a computer.

In act 1308, the object, having been transformed in act 1306, is fabricated in contact with the auxiliary object.

Figure 14:
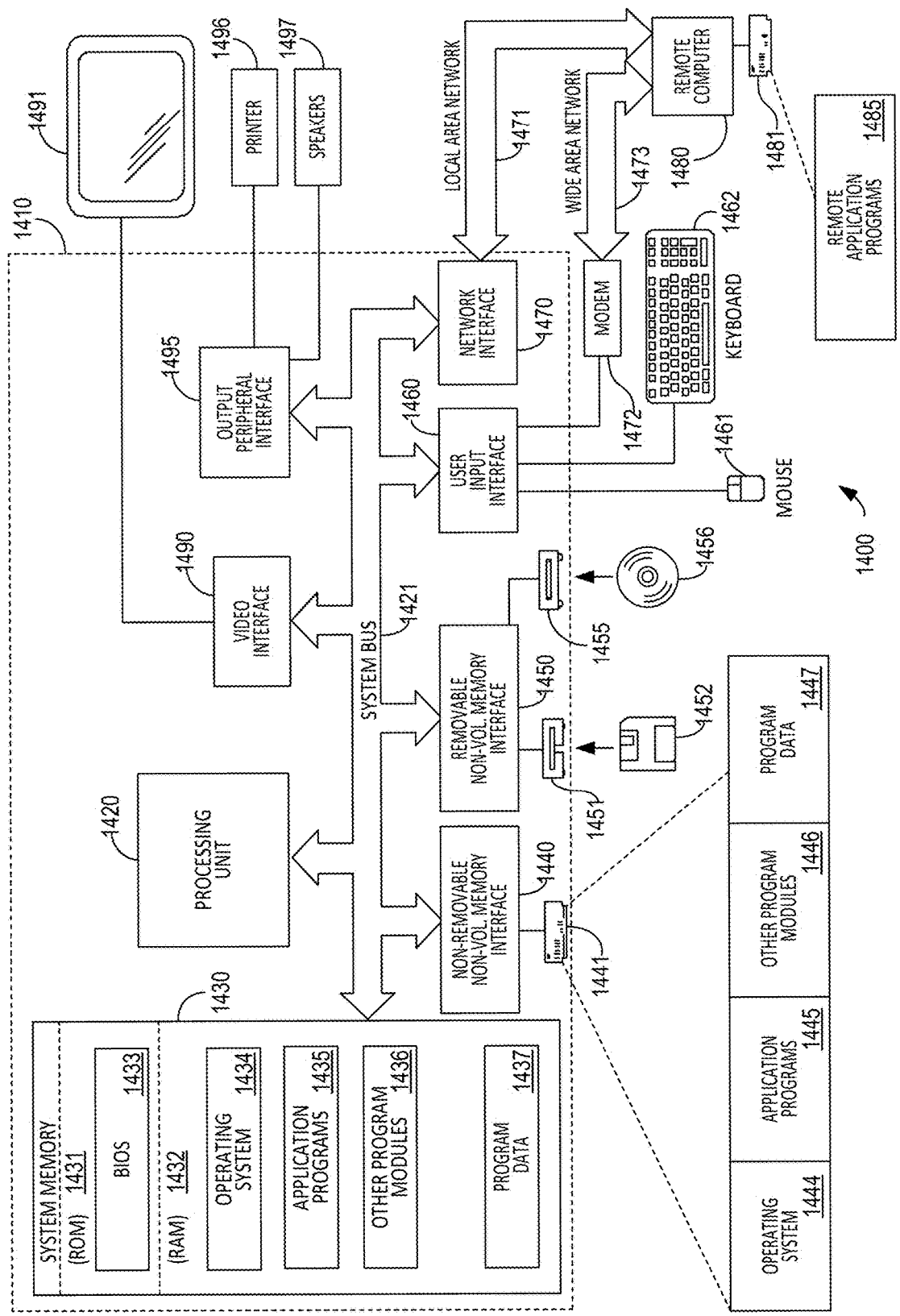
FIG. 14 depicts an example of a computing system environment on which aspects of the invention may be implemented.

FIG. 14 depicts an example of a suitable computing system environment 1400 on which aspects of the invention may be implemented. For example, the computing system environment 1400 may be used to operate a machine vision system and/or any components of an additive fabrication device. Such a computing environment may represent a home computer, a tablet, a mobile device, a server and/or any another computing device.

The computing system environment 1400 is only one example of a suitable computing environment and is not intended to suggest any limitation as to the scope of use or functionality of the invention. Neither should the computing environment 1400 be interpreted as having any dependency or requirement relating to any one or combination of components illustrated in the illustrative operating environment 1400.

Aspects of the invention are operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 14, an illustrative system for implementing aspects of the invention includes a general purpose computing device in the form of a computer 1410. Components of computer 1410 may include, but are not limited to, a processing unit 1420, a system memory 1430, and a system bus 1421 that couples various system components including the system memory to the processing unit 1420. The system bus 1421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1410 typically includes a variety of computer readable media. Computer readable media can be any available media that can be accessed by computer 1410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1430 includes computer storage media in the form of volatile and/or nonvolatile memory such as read only memory (ROM) 1431 and random access memory (RAM) 1432. A basic input/output system 1433 (BIOS), containing the basic routines that help to transfer information between elements within computer 1410, such as during start-up, is typically stored in ROM 1431. RAM 1432 typically contains data and/or program modules that are immediately accessible to and/or presently being operated on by processing unit 1420. By way of example, and not limitation, FIG. 14 illustrates operating system 1434, application programs 1435, other program modules 1436, and program data 1437.

The computer 1410 may also include other removable/non-removable, volatile/nonvolatile computer storage media. By way of example only, FIG. 14 illustrates a hard disk drive 1441 that reads from or writes to non-removable, nonvolatile magnetic media, a magnetic disk drive 1451 that reads from or writes to a removable, nonvolatile magnetic disk 1452, and an optical disk drive 1455 that reads from or writes to a removable, nonvolatile optical disk 1456 such as a CD ROM or other optical media. Other removable/non-removable, volatile/nonvolatile computer storage media that can be used in the illustrative operating environment include, but are not limited to, magnetic tape cassettes, flash memory cards, digital versatile disks, digital video tape, solid state RAM, solid state ROM, and the like. The hard disk drive 1441 is typically connected to the system bus 1421 through a non-removable memory interface such as interface 1440, and magnetic disk drive 1451 and optical disk drive 1455 are typically connected to the system bus 1421 by a removable memory interface, such as interface 1450.

The drives and their associated computer storage media discussed above and illustrated in FIG. 14, provide storage of computer readable instructions, data structures, program modules and other data for the computer 1410. In FIG. 14, for example, hard disk drive 1441 is illustrated as storing operating system 1444, application programs 1445, other program modules 1446, and program data 1447. Note that these components can either be the same as or different from operating system 1434, application programs 1435, other program modules 1436, and program data 1437. Operating system 1444, application programs 1445, other program modules 1446, and program data 1447 are given different numbers here to illustrate that, at a minimum, they are different copies. A user may enter commands and information into the computer 1410 through input devices such as a keyboard 1462 and pointing device 1461, commonly referred to as a mouse, trackball or touch pad. Other input devices (not shown) may include a microphone, joystick, game pad, satellite dish, scanner, or the like. These and other input devices are often connected to the processing unit 1420 through a user input interface 1460 that is coupled to the system bus, but may be connected by other interface and bus structures, such as a parallel port, game port or a universal serial bus (USB). A monitor 1491 or other type of display device is also connected to the system bus 1421 via an interface, such as a video interface 1490. In addition to the monitor, computers may also include other peripheral output devices such as speakers 1497 and printer 1496, which may be connected through an output peripheral interface 1495.

The computer 1410 may operate in a networked environment using logical connections to one or more remote computers, such as a remote computer 1480. The remote computer 1480 may be a personal computer, a server, a router, a network PC, a peer device or other common network node, and typically includes many or all of the elements described above relative to the computer 1410, although only a memory storage device 1481 has been illustrated in FIG. 14. The logical connections depicted in FIG. 14 include a local area network (LAN) 1471 and a wide area network (WAN) 1473, but may also include other networks. Such networking environments are commonplace in offices, enterprise-wide computer networks, intranets and the Internet.

When used in a LAN networking environment, the computer 1410 is connected to the LAN 1471 through a network interface or adapter 1470. When used in a WAN networking environment, the computer 1410 typically includes a modem 1472 or other means for establishing communications over the WAN 1473, such as the Internet. The modem 1472, which may be internal or external, may be connected to the system bus 1421 via the user input interface 1460, or other appropriate mechanism. In a networked environment, program modules depicted relative to the computer 1410, or portions thereof, may be stored in the remote memory storage device. By way of example, and not limitation, FIG. 14 illustrates remote application programs 1485 as residing on memory device 1481. It will be appreciated that the network connections shown are illustrative and other means of establishing a communications link between the computers may be used.

The various methods or processes outlined herein may be implemented in any suitable hardware. Additionally, the various methods or processes outlined herein may be implemented in a combination of hardware and of software executable on one or more processors that employ any one of a variety of operating systems or platforms. For example, the various methods or processes may utilize software to instruct a processor to compute a layer mask, transform a model of an object, operate one or more actuators to move a machine vision system, a printhead, a build platform, etc., or combinations thereof. Example of such approaches are described above. However, any suitable combination of hardware and software may be employed to realize any of the embodiments discussed herein.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Having herein described several embodiments, several advantages of embodiments of the present application should be apparent. One advantage is that an object may be designed based on any number of available materials such that the object, when fabricated, exhibits one or more desired properties. A non-limiting list of applications for which embodiments described herein may be used include forming microlens array, optical fiber bundles, meta-materials (including multi-material meta-materials), printable fabrics, goal-based caustics, objects formed over electronics components (e.g., forming a privacy screen over a mobile device), and combinations thereof.

While techniques of machine vision described herein have, in some cases, been described in the context of Optical Coherence Tomography, it will be appreciated that the techniques described herein are not limited to any particular type of machine vision technique, and may be used with any suitable type of machine vision. Machine vision techniques that may be used with techniques described herein include, but are not limited to, Optical Coherence Tomography (OCT), stereo triangulation, terahertz imaging, shape from specularity, depth from focus, confocal microscopy, time of flight, or combinations thereof.

In general, any suitable type of machine vision system may be used that provides a resolution, at least along one axis, that is approximately less than or equal to the resolution of the additive fabrication device being used. For example, if an additive fabrication device has a 30 μm resolution in the x, y and/or z-axis, a machine vision system that may resolve 30 μm-sized details on a surface, or smaller details, may be used.

Moreover, a machine vision technique may, in some embodiments, be used based on the technique's effectiveness at sensing particular a particular material or materials. For example, some techniques (e.g., interferometric-based techniques) may provide comparatively better accuracy when sensing an optically clear material but may provide a comparatively worse accuracy when sensing a dark, or black material. Other techniques, such as shape from specularity, may provide comparatively better accuracy when sensing a material that produces specular highlights when light hits it.

A machine vision system suitable for use with the techniques described herein may utilize any number of image sensors, which may be employed individually or in combination in practicing any of the methods and processes described herein. Moreover, the techniques described herein may be used in any combination, and are not limited to the distinct processes described herein. For example, an object may be fabricated by an additive fabrication device in contact with an auxiliary object after calibration of the additive fabrication device using the techniques described herein.

As used herein, the term "machine vision" includes any technology, process and/or method in which imaging-based inspection of a surface is performed and may include one or more computer vision and/or image processing technologies, processes and/or methods. For example, a machine vision system may form an image representing a depth of a surface of an object and perform one or more image processing operations on the image before techniques described herein that are based on a depth map of a surface are performed. In general, any suitable combination of image-based techniques may be performed in any suitable sequence when practicing the techniques described herein.

Data describing a three-dimensional object suitable for fabrication using an additive fabrication device may be described using any suitable format, including any data format that defines a three-dimensional geometry (e.g., by defining positions of vertices, normals and/or faces). A non-limiting list of suitable formats for an input shape may include STereoLithography (STL), Wavefront OBJ, Additive Manufacturing File Format (AMF), ObjDF, Stratasys SLC, Zmodeler Z3D, Lightwave LWO, Autodesk Maya and/or 3D Studio Max, etc.

While techniques described herein have, in some cases, been described in the context of ink jet additive fabrication, it will be appreciated that the techniques described herein are not limited to designing objects to be fabricated using ink jet additive fabrication, and may be used with any suitable type of fabrication technique(s). For example, techniques described here may be used with additive fabrication techniques including, but not limited to, stereolithography, selective or fused deposition modeling, direct composite manufacturing, laminated object manufacturing, selective phase area deposition, multi-phase jet solidification, ballistic particle manufacturing, particle deposition, laser sintering, polyjet, or combinations thereof.

Various inventive concepts may be embodied as one or more methods, of which examples have been provided. The acts performed as part of any method described herein may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein, unless clearly indicated to the contrary, should be understood to mean "at least one."

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

What is claimed is:

1. A method for additive fabrication, comprising:
fabricating a first object on a build platform of an additive fabrication system, including operating a printhead assembly of the additive fabrication system to deposit material forming the first object to have one or more known spatial characteristics represented in a first coordinate system associated with the printhead assembly, the printhead assembly being in an unknown spatial relationship with the build platform;
sensing the first object after fabrication using an imaging device to determine sensed spatial characteristics of the first object represented in a second coordinate system associated with the imaging device, wherein the imaging device is in an unknown spatial relationship with the printhead assembly;
determining numerical configuration information, including determining a relationship between the second coordinate system and the first coordinate system from a relationship of the known spatial characteristics of the first object and the sensed spatial characteristics of the first object; and
configuring the additive fabrication system using the numerical configuration information for fabrication of one or more objects according to models of said objects.

2. The method of claim 1, further comprising:
fabricating a second object according to a model of the second object, including sensing the second object during fabrication of the second object using the imaging system to provide feedback information, and using the feedback information and the numerical configuration information to operate the printhead assembly to deposit material forming the second object volumetrically matching the model of the second object.

3. The method of claim 1, wherein the known spatial characteristics of the first object comprise a known three-dimensional structure.

4. The method of claim 3, wherein the known three-dimensional structure comprises a grid structure.

5. The method of claim 1, wherein determining the numerical configuration information includes determining a representation of a spatial mapping between the first coordinate system and the second coordinate system.

6. The method of claim 5, wherein determining the representation of the spatial mapping comprises determining a homography matrix representation.

7. The method of claim 5, wherein determining the representation of the spatial mapping comprises determining at least one of a relative position and a relative orientation of the printhead assembly and the imaging device.

8. The method of claim 1, wherein:
the build platform comprises known spatial characteristics represented in a third coordinate system associated with the build platform;
the method further comprises sensing the build platform using the imaging device to determine sensed spatial characteristics of the build platform represented in the second coordinate system; and
determining the numerical configuration information further includes determining a relationship between the second coordinate system and the third coordinate system from a relationship of the known spatial characteristics of the build platform and the sensed spatial characteristics of the build platform.

9. The method of claim 8, wherein determining the numerical configuration information further includes determining a relationship between the first coordinate system and the third coordinate system.

10. The method of claim 9, wherein fabricating a second object includes operating the printheads to deposit material to form the second object according the model of the second object at a controlled location on the build platform.

11. The method of claim 8, wherein sensing the build platform comprises sensing a known image formed on the build platform.

12. The method of claim 8, wherein sensing the build platform comprises sensing a known three-dimensional structure formed on the build platform.

13. The method of claim 8, wherein the sensing of the build platform is performed prior to fabricating of the first object.

14. The method of claim 1, wherein the printhead assembly includes a plurality of printheads, and wherein determining the numerical configuration information, includes determining relationships between the second coordinate system and coordinate systems associated with respective printheads of the printhead assembly.

15. An additive fabrication system comprising:
a build platform;
a printhead assembly;
an imaging device; and
a controller;
wherein the build platform, printhead assembly, and imaging device prior to configuration of the system by the controller, are in unknown spatial relationships with one another; and wherein the controller is configured to:

fabricate a first object on a build platform by operating the printhead assembly to deposit material forming the first object to have one or more known spatial characteristics represented in a first coordinate system associated with the printhead assembly;

sense the first object after fabrication using the imaging device to determine sensed spatial characteristics of the first object represented in a second coordinate system associated with the imaging device;

determine numerical configuration information, including determining a relationship between the second coordinate system and the first coordinate system from a relationship of the known spatial characteristics of the first object and the sensed spatial characteristics of the first object; and store the numerical fabrication information for use in fabrication of one or more objects according to models of said objects.

* * * * *